United States Patent [19]
Kawamura et al.

[11] Patent Number: 5,621,840
[45] Date of Patent: *Apr. 15, 1997

[54] DATA TRANSMISSION METHOD AND APPARATUS, DATA DECODING APPARATUS, AND DATA RECORDING MEDIUM

[75] Inventors: Makoto Kawamura; Yasushi Fujinami, both of Kanagawa; Markus H. Veltman, Tokyo, all of Japan

[73] Assignee: Sony Corporation, Tokyo, Japan

[ * ] Notice: The term of this patent shall not extend beyond the expiration date of Pat. No. 5,445,684.

[21] Appl. No.: 432,145

[22] PCT Filed: Sep. 21, 1994

[86] PCT No.: PCT/JP94/01556

§ 371 Date: May 5, 1995

§ 102(e) Date: May 5, 1995

[87] PCT Pub. No.: WO95/08823

PCT Pub. Date: Mar. 30, 1995

[30] Foreign Application Priority Data

Sep. 21, 1993 [JP] Japan .................................. 5-235121

[51] Int. Cl.⁶ ............................ H04N 5/91; H04N 5/928; H04N 5/917; H04N 7/26
[52] U.S. Cl. ................................ 386/68; 386/94; 386/95; 386/111
[58] Field of Search ...................... 358/335, 342; 348/423; 386/68, 94, 95, 111, 109, 112, 124; 360/15, 20, 8, 60, 32

[56] References Cited

U.S. PATENT DOCUMENTS

| | | | |
|---|---|---|---|
| 5,140,437 | 8/1992 | Yomemitsu et al. | 358/342 |
| 5,371,602 | 12/1994 | Tsuboi et al. | 358/335 |
| 5,414,455 | 5/1995 | Hooper et al. | 348/7 |
| 5,455,684 | 10/1995 | Fujinami et al. | 358/335 |
| 5,568,274 | 10/1996 | Fujinami et al. | 386/107 |

*Primary Examiner*—Tommy P. Chin
*Assistant Examiner*—David R. Vincent
*Attorney, Agent, or Firm*—Limbach & Limbach L.L.P.

[57] ABSTRACT

A video data transmission method and apparatus for transmitting video encoded data with intra-coded video data portions therein suitable for selective high speed reproduction. A first entry point is detected in the encoded data which corresponds to the position of a first intra-coded video data portion. At least one packet is generated on the basis of the decoded first entry point that includes position information relating to at least one second entry point and at least one additional information relating to the video encoded data. The second entry point exists in a forward direction or in a backward direction relative to the first entry point and corresponds to position of at least one second intra-coded video data portion. The packet is multiplexed at a predetermined position of the video encoded data, wherein the multiplexed video encoded data is suitable for selective high speed reproduction of the intra-coded video data portions.

32 Claims, 21 Drawing Sheets

STREAM_ID TABLE

| STREAM ID(BINARY) | STREAM TYPE |
|---|---|
| 1011 1100<br>1011 1101<br>1011 1110<br>1011 1111<br><br>110x xxxx<br>1110 xxxx<br>1111 xxxx | RESERVED STREAM<br>PRIVATE_STREAM_1<br>PADDING STREAM<br>PRIVATE_STREAM_2<br><br>AUDIO STREAM-NUMBER xxxx<br>VIDEO STREAM-NUMBER xxxx<br>RESERVED DATA STREAM-NUMBER xxxx |

FIG.4

(Prior Art)

| PACKET START CODE PREFIX | ID | LENGTH | AAAA ID | AAAA PACKET TYPE | CURRENT # DATA STREAMS | CURRENT # VIDEO STREAMS | CURRENT # AUDIO STREAMS | ENABLE FLAG | -3 | -2 | -1 | +1 | +2 | +3 |

DATA TRANSMISSION METHOD AND APPARATUS, DATA DECODING APPARATUS, AND DATA RECORDING MEDIUM

TECHNICAL FIELD

This invention relates to a data transmission method and a data transmission apparatus, a data decoding apparatus, and a data recording medium, and more particularly to a data transmission method and a data transmission apparatus, a data decoding apparatus, and a data recording medium suitable when used in the case of allowing picture data and speech data encoded at a variable rate to undergo time-division multiplex recording onto a disc to search a predetermined picture at a high speed.

BACKGROUND ART

Examples of conventional data encoding apparatus and data decoding apparatus are shown in FIGS. 1 and 2. In FIG. 1, a video signal is compressed and encoded by video encoder 1 and is inputted to code buffer 4 within multiplexing unit 3. Moreover, a speech signal is compressed and encoded by audio encoder 2, and is inputted to code buffer 5 of the multiplexing unit 3.

Output terminals of code buffers 4, 5 are respectively connected to input terminals E1, E2 of switching circuit 6. Output terminal F of the switching circuit 6 is connected to input terminal of header adding circuit 7. Output of the header adding circuit 7 is delivered to digital data recording unit (DSM) 10 composed of recording medium, e.g., magneto-optical disc or magnetic disc (hard disc), etc., recording/reproducing head and head drive circuit, etc. Control section 8 receives input of system clock that multiplexing system clock generating circuit 9 outputs to sequentially allow input terminals E1, E2 of the switching circuit 6 to be in the state connecting to output terminal F by a predetermined period to sequentially take out data from code buffer 4 or 5 to carry out time-division multiplexing thereof.

The control section 8 controls switching circuit 6 and header adding circuit 7 so that bit stream is generated in accordance with the format shown in FIG. 3

Namely, as shown in FIG. 3, in the multiplexing system of ISO11172 (MPEG), unit (one) multiplexing bit stream is composed of one PACK or more and one ISO_11172_end_code_. The ISO_11172_end_code is code of 32 bits, and is expressed as 0x000001b9 by hexadecimal number. Here, the leading Ox indicates that corresponding code is hexadecimal number (C language).

One pack is composed of header consisting of Pack_Start_Code, SCR (System Clock Reference) MUX_Rate, and one Packet or more. When Pack_Start_Code of header is code of 32 bits, it is expressed as 0x000001b4 by hexadecimal number. Although the length of a pack is defined as variable length, its length shall now assumed to be fixed to 2048 bytes for simplicity.

One packet is composed of header consisting of Packet_Start_Code_Prefix, stream_id, Packet_length, PTS (Presentation Time Stamp) and DTS (Decoding Time Stamp), and packet data (Code Data). Packet_Start_Code_Prefix is code of 24 bits and is expressed as 0x000001. stream_id is code of 8 bits and indicates kind of packet as shown 1 n FIG. 4. Packet_length (16 bits) indicates lengths packets subsequent thereto.

Audio data (in the case of audio stream) or video data (in the case of video stream) is recorded into Code Data of respective packets. Moreover, since audio stream has 32 kinds of different stream-id and video stream has 16 kinds thereof, it is possible to multiplex plural audio and video signals corresponding to the numbers of these kinds at the maximum.

Reserved stream has data, e.g., character, etc. Uses of private_stream_1 and private_stream_2 are not determined. Padding_stream is used for increasing data quantity.

In accordance with the above-mentioned format, control section 8 carries out processing of addition of header and reading of code by using algorithm as shown in FIG. 5, for example, so that interval (length) of the pack becomes equal to 2048 bytes.

First, control section 8 instructs header adding circuit 7 to add pack header (step S1). Then, the control unit 8 waits until sum of M4 and M5 is equal to code data quantity D included within one pack, or is greater than that (step S2). Namely, the control section 8 waits until data contained within one pack is stored into code buffers 4, 5.

Here, M4 is data quantity written in code buffer 4 and M5 is data quantity written in code buffer 5, Moreover, D indicates total quantity of data included within one pack. Now, for simplification, D is assumed to be constant, i,e., value obtained by subtracting size (length) of pack header, size (length) of video packet header and size (length) of audio packet header from size (length) (2048 bytes) of pack, Then, quantity P1 of video data contained within that pack and quantity P2 of audio data contained within that pack are calculated in accordance with the following formula (step 3).

$$P1 = D \times M4/(M4+M5)$$

$$P2 = D - P1$$

In the above formula, total quantity D of code data contained within pack is simply allocated (allotted) by ratio between data quantities of respective code buffers 4, 5.

When data quantity is determined, control section 8 instructs header adding circuit 7 to output video packet (step S4). Then, control section 8 reads out video data of P1 bytes from code buffer 4 to output it to DSM 10 (step S5). Similarly, control section 8 adds audio packet header (step S6) to read out audio data of P2 bytes from code buffer 5 to output it to DSM 10 (step S7). In the DSM 10, these input data are recorded onto disc included therein.

The data recorded onto the disc in this way is decoded at data decoding apparatus shown in FIG. 2. Namely, header separating circuit 22 of separating unit 21 separates pack header and packet header from the data which has been read out from DSM 10 to deliver the separated data to control section 24, and to deliver time-division multiplexed data to input terminal G of switching circuit 23. Output terminals H1, H2 of switching circuit 23 are respectively connected to input terminals of video decoder 25 and audio decoder 26. Control section 24 of the separating unit 21 allows input terminal G and output terminals H1 and H2 of the switching circuit 23 to be sequentially in connecting state in accordance with stream_id of packet header delivered from header separating circuit 22 to correctly separate the time-division multiplexed data to deliver it to corresponding decoder.

In the case where multiplexed video data is compressed by the encoding system of MPEG in this way, there occurs limitation in random access or search operation. Namely, in MPEG, there are intra-frame coded picture (I (intra) picture), interframe coded picture (P (Predictive) picture), and B (Bidirectionaly predictive) picture). Since encoding of I picture is carried out by using only data within that picture (frame or field), compression efficiency of data becomes lower. Such I picture itself can be decoded. Since P picture and B picture are picture obtained by difference signal from pictures before and after, the compression efficiency of data becomes higher. In order to decode such P picture or B picture, a predictive picture before or after that is required. For this reason, ordinarily, about 2 frames of I picture are caused to occur per second, thus to take balance between random access characteristic and compression efficiency.

Conceptual view of bit stream including I picture, P picture and B picture recorded onto disc by DSM 10 is shown in FIG. 6. A sequence of video bit streams are divided into one GOP (Group of Pictures) or more. GOP has I picture at the leading portion thereof. In the case where compression of fixed rate is being carried out with respect to video data, since I pictures cyclically appear at predetermined positions, corresponding position is determined by calculation, thereby making it possible to provide an access thereto. However, in the case where compression of variable rate is being carried out, position of I picture becomes indefinite. Thus, it is difficult to provide an access.

Namely, in the data decoding apparatus of FIG. 2, in the case where instruction of search is given thereto, main control unit (not shown) instructs video decoder 25 and audio decoder 26 to shift the operation mode to search mode. In the search mode, video decoder 25 decodes only data of I picture from inputted video data. Alternatively, only data of I picture is selected at separating unit 21, and the selected data is inputted to video decoder 25. At the video decoder 25, the inputted data is decoded.

In the search mode, control section 24 instructs DSM 10 to issue command to move read-out position of data on the disc in forward (or backward) direction. While quantity of movement of read-out position at this time is dependent upon speed of search or encoding rate, etc., as speed of search becomes higher, or encoding rate becomes higher, quantity of movement is increased. When read-out position is moved to a predetermined position, data outputted from DSM 10 is inputted to separating unit 21. Header separating circuit 22 separates video data to deliver it to video decoder 25. The video decoder 25 decodes I picture which has appeared first to output it. In the search mode, audio decoder 26 is caused to be placed in mute state.

As stated above, search operation (continuous reproduction of I pictures) is realized as repetition of random access. Namely, in the case where, e.g., high speed search in forward direction is instructed from user, video decoder 25 skips read-out of data of a predetermined number of frames of data inputted thereto to search I picture to decode the I picture to output it. Alternatively, search of I picture is carried out by DSM 10, and only data of I picture is delivered to video decoder 25, at which it is decoded. By repeating such an operation, search operation (continuous reproduction of I pictures) is realized.

As stated above, in the conventional apparatus, since the apparatus cannot recognize position (access point) of I picture, such an operation to move reproduction position to some extent thereafter to wait access point becomes necessary. For this reason, there was the problem that repetition period of search operation becomes long, so rapid (quick) search operation becomes difficult.

This invention has been made in view of such circumstances and contemplates rapidly finding out access point of video data, thus making it possible to carry out quick search at a desired speed.

DISCLOSURE OF THE INVENTION

A data transmission method according to this invention is directed to a data transmission method for carrying out transmission of encoded data, the method comprises the steps of: detecting a first entry point from at least one encoded data; generating, on the basis of the detected first entry point, packets including position information relating to at least one second entry point existing in a forward direction or in a backward direction relative to the first entry point and at least one additional information relating to the encoded data; and multiplexing the packets at a predetermined position of the encoded data. Moreover, a data transmission apparatus according to this invention is characterized in that the above-described data transmission method is applied.

By features as described above, it is possible to carry out transmission of information for conducting quick search at a desired speed in special reproduction.

Moreover, a data decoding apparatus according to this invention is directed to a data decoding apparatus adapted for decoding reproduction data read out from a recording medium, characterized in that the apparatus comprises: separating means for separating, from the reproduction data, encoded data and a packet including position information relating to at least one second entry point existing in a forward direction or in a backward direction relative to a first entry point and at least one additional information relating to the encoded data; decoding means for decoding the encoded data separated by the separating means; and control means for controlling read-out position of the recording medium on the basis of the position information and the additional information at the time of special reproduction.

By such a configuration, it is possible to carry out, in special reproduction, rapid search at a desired speed by using transmitted packet data.

In addition, a data recording medium according to this invention is directed to a data recording medium on which encoded data are recorded, characterized in that the data recording medium is formed by detecting a first entry point from at least one encoded data to generate, on the basis of the detected first entry point, packets including position information relating to at least one second entry point existing in a forward direction or in a backward direction relative to the first entry point and at least one additional information relating to the encoded data to multiplex the packets at a predetermined position of the encoded data to record the multiplexed data onto the recording medium.

When such a data recording medium is used, it is possible to carry out rapid search of data on the recording medium at a desired speed.

BRIEF DESCRIPTION OF THE DRAWINGS

FIG. 4 is a view for explaining stream_id of FIG. 3.

FIG. 10 is a view for explaining the format of entry packet of this invention.

FIG. 16 is a view for explaining a still further embodiment of the format of entry packet of this invention.

BEST MODE FOR CARRYING OUT THE INVENTION

Figure 1:
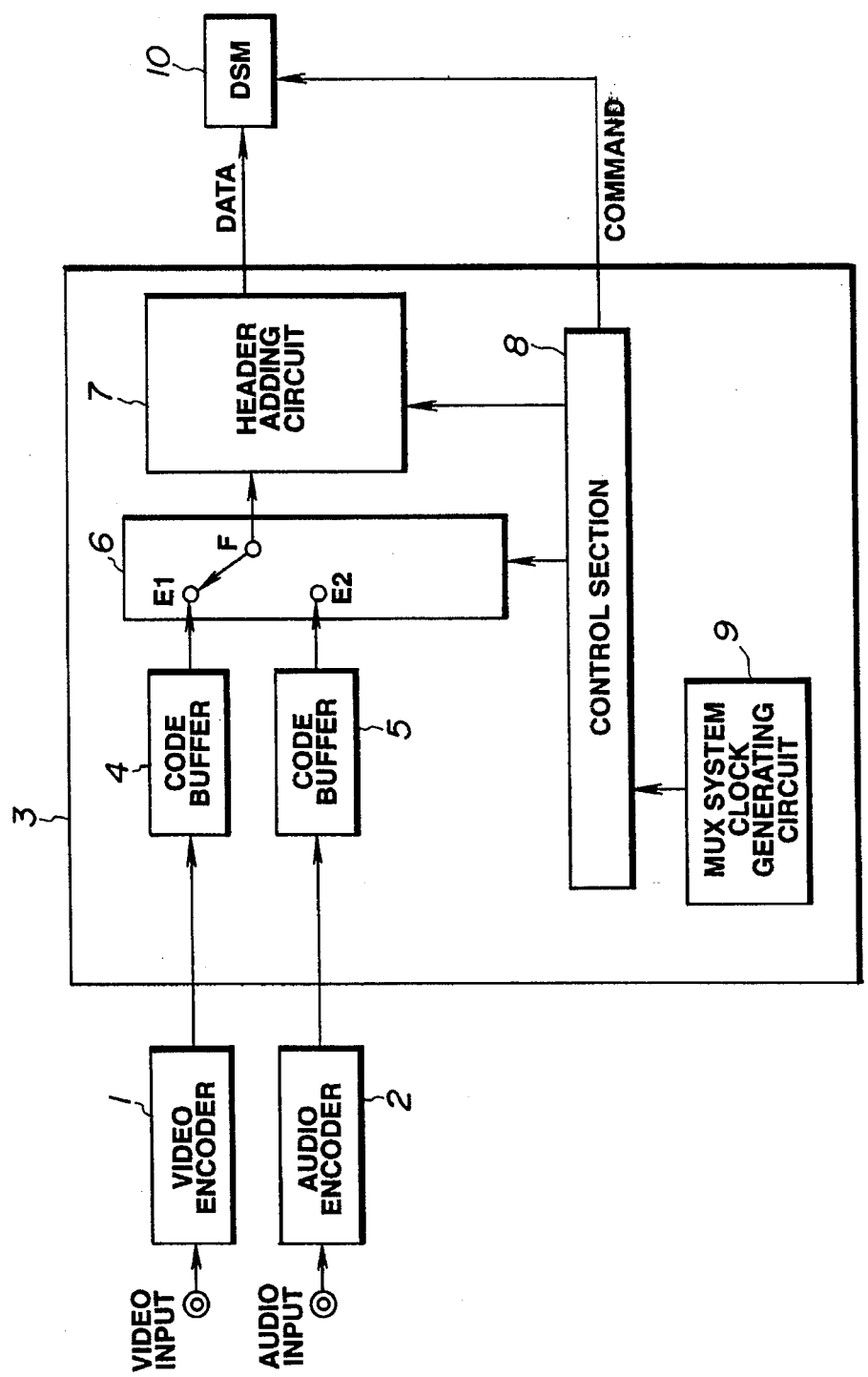
FIG. 1 is a block diagram showing an example of conventional data encoding apparatus.
Figure 2:
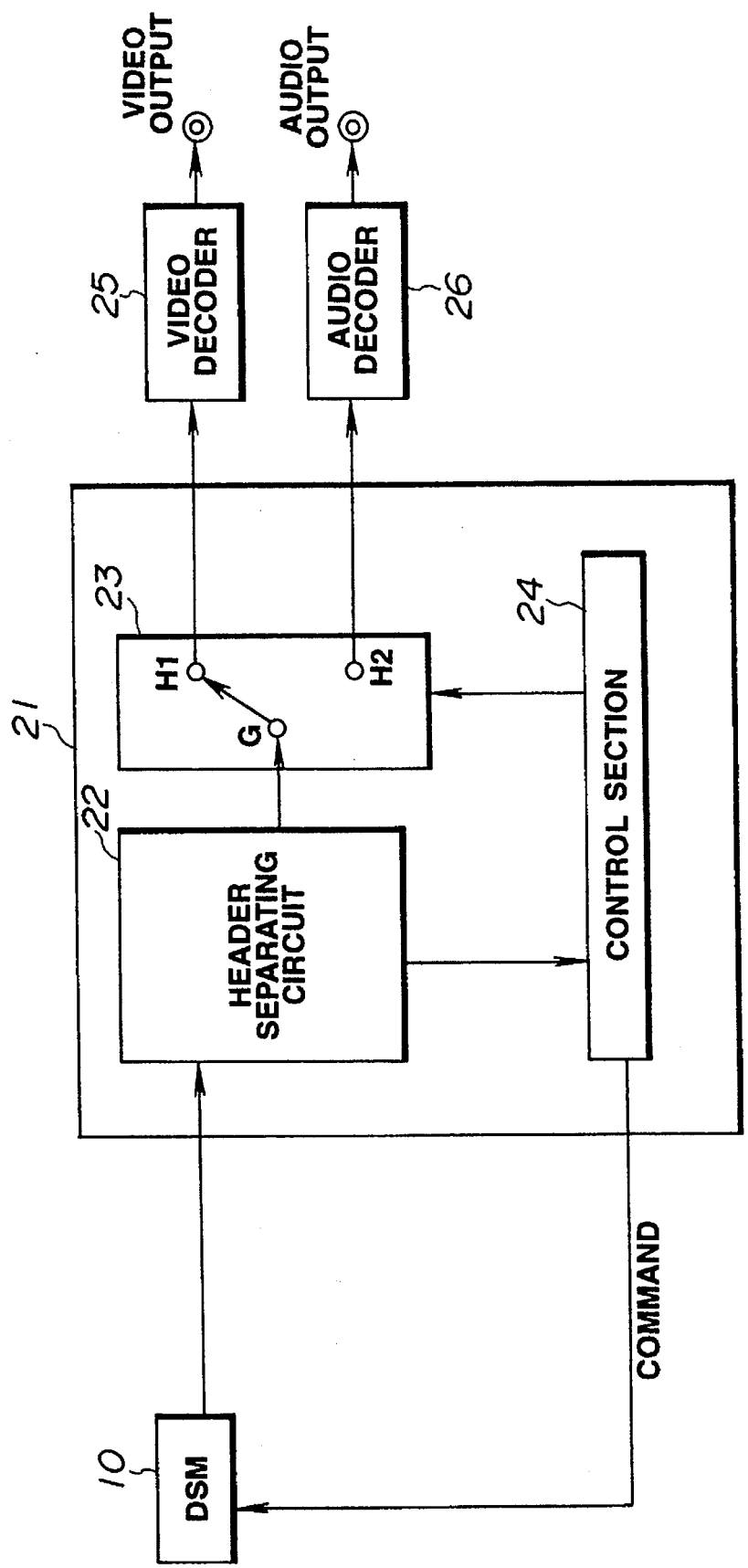
FIG. 2 is a block diagram showing an example of conventional data decoding apparatus.
Figure 7:
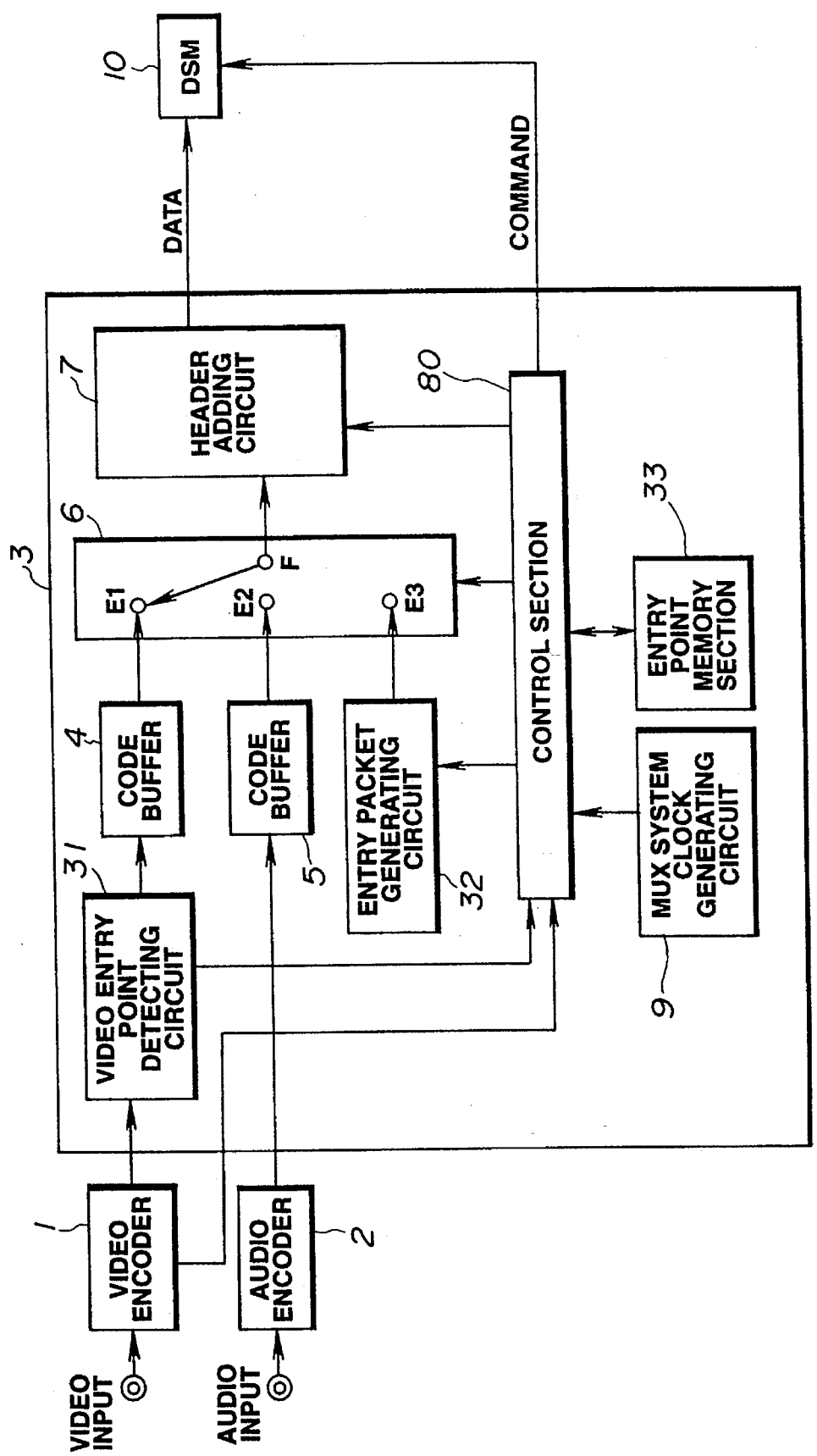
FIG. 7 is a block diagram showing the configuration of an embodiment of a data encoding apparatus to which this invention is applied.
Figure 8:
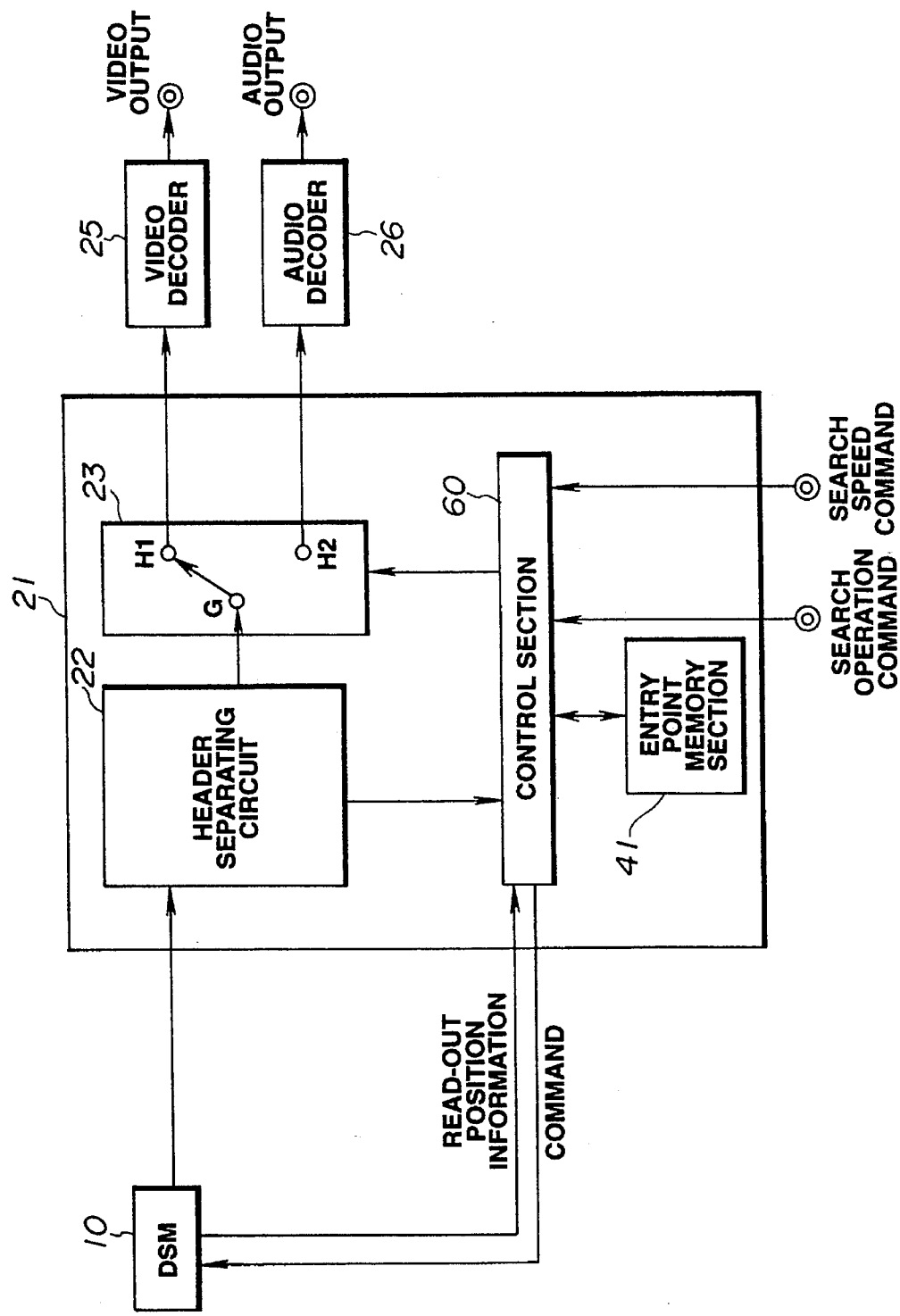
FIG. 8 is a block diagram showing the configuration of an embodiment of a data decoding apparatus of this invention.

FIGS. 7 and 8 are block diagrams showing the configuration of embodiments of a data encoding apparatus and a data decoding apparatus to which a data transmission method according to this invention is applied, and the same reference numerals are respectively attached to the same components as those in the case of the apparatuses in FIGS. 1 and 2.

In the data encoding apparatus of FIG. 7, output terminal of video encoder 1 is connected to input terminal of video entry point detecting circuit 31, and its output terminal is connected to input terminal of code buffer 4. Entry packet generating circuit 32 receives control input of control section 80 to deliver its output to input terminal E3 of switching circuit 6. Moreover, control section 80 receives input of system clock that multiplexing system clock generating circuit 9 outputs to allow input terminals E1, E2, E3 of switching circuit 6 and output terminal F thereof to be sequentially in connecting states by a predetermined period to sequentially take out data from code buffers 4, 5 or entry packet generating circuit 32 to carry out time-division multiplexing thereof to output it to header adding circuit 7.

Moreover, control section 80 controls header adding circuit 7 to allow it to add video packet header to video data read out from code buffer 4. Moreover, control section 80 allows header adding circuit 7 to add audio packet header to audio data read out from code buffer 5.

Further, control section 80 receives input of entry point generation signal generated at a generation timing of I picture from video encoder 1 or video entry point detecting circuit 31 to control entry packet generating circuit 32 to allow it to insert entry packet at a predetermined position of bit stream. In the case where video encoder 1 is of a structure capable of outputting an entry point generation signal, video encoder 1 outputs an entry point generation signal at a generation timing of I picture.

Moreover, in the case of a configuration in which video encoder 1 cannot output an entry point generation signal, or in multiplexing already encoded video bit streams, video entry point detecting circuit 31 generates an entry point generation signal of I picture, or detects entry point from video data inputted from video encoder 1 to output entry point generation signal. Entry point memory section 33 is a memory which is permitted to undergo read/write operation from control section 80, and serves to store position of detected entry point. Other components are similar to those in the case of FIG. 1.

Figure 9:
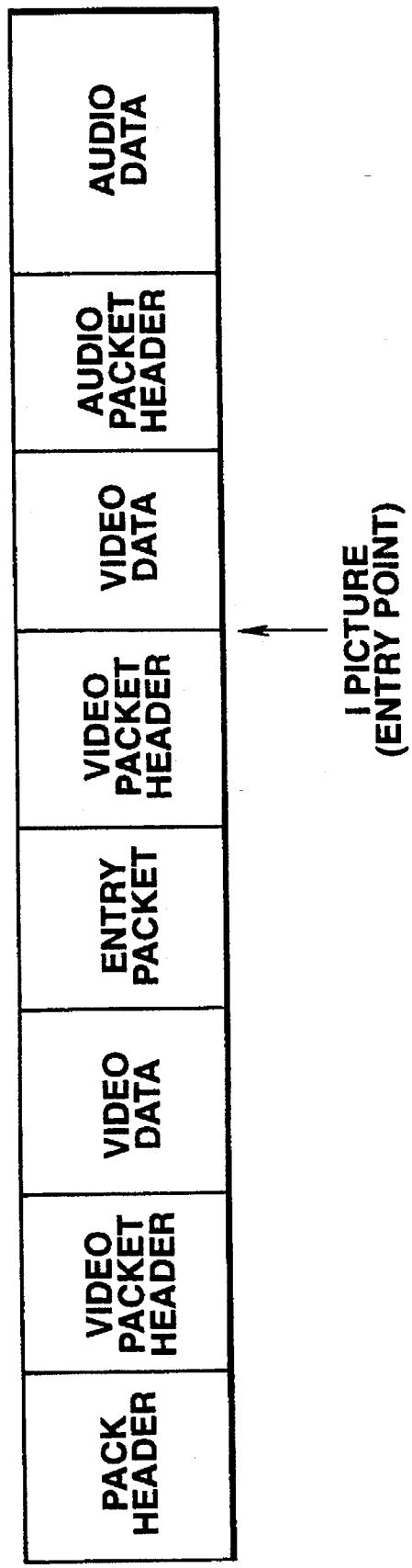
FIG. 9 is a view showing the format of pack of this invention.

Also in the embodiment shown in FIG. 7, multiplexed bit stream consists of at least one pack and ISO__11172__end__ code. Respective packs are constituted by a format as shown in FIG. 9, for example.

Figure 3:
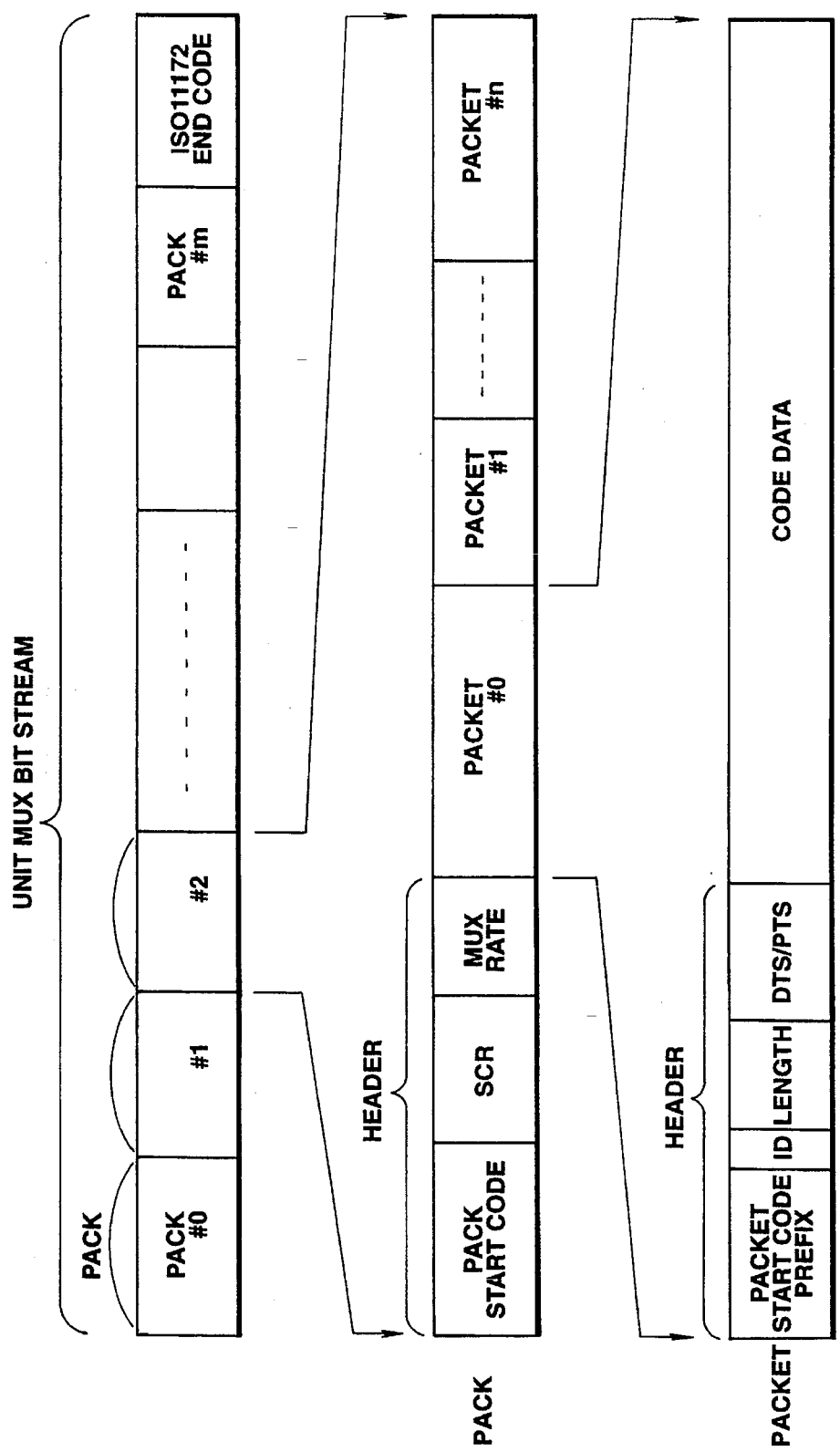
FIG. 3 is a view for explaining the format of conventional bit stream.

Namely, initially, similarly to the case in FIG. 3, Pack__Header consisting of Pack__Start__Code, SCR, MUX__Rate is allocated. Subsequently thereto, Video__Packet__Header is allocated. Further, subsequently thereto, video data including no I picture are respectively allocated by packet structure. Subsequently to video data, Entry__Packet and Video__Packet__Header are allocated in order recited. Further, subsequently thereto, video data including I picture are allocated by packet structure. Namely, immediately before video data including I picture (entry point) (immediately before Video__Packet__Header), Entry__Packet is allocated. In the case of the embodiment, after video data, Audio__Packet__Header is allocated. Subsequently thereto, audio data are successively allocated by packet structure.

Entry__Packet is caused to be format as shown in FIG. 10. This format corresponds to the format of private__stream__2 of packets of MPEG. At the leading portion, Packet__Start__Code__Prefix is allocated. After that, stream__id expressed as 0xbf by hexadecimal number is allocated.

After that, length indicating length of packet subsequent thereto is allocated. The above-mentioned allocation is similar to that in the case of header of packet in FIG. 3. In this embodiment, AAAA__id is allocated next. This indicates that the private packet is the format peculiar to user recognized by AAAA. After that, AAAA__packet__type is allocated. This indicates classification within private packet format peculiar to user, and is caused to be 0xff in the case of entry packet. Current__#__data__streams, current__#__video__streams, current__#audio__streams successively allocated after that respectively indicate the numbers of data packets, video packets and audio packets multiplexed immediately before next entry packet. Further subsequently thereto, enable__flag indicating validity of entry packet position information is allocated.

Still further subsequently thereto, entry__packet__−3, entry__packet__−2, entry__packet__−1, entry__packet__+1, entry__packet__+2 and entry__packet__+3 are successively allocated. In these areas, positions of entry packets existing backward by three (entry points), backward by two, backward by one, forward by one, forward by two and forward by three, and relative distances with respect to these entry packets indicated by the number of sectors of the disc driven by DSM 10 are respectively recorded. Accordingly, while entry_packet_−3, entry_packet_−2, entry_packet_−1, entry_packet_+1, entry_packet_+2, and entry_packet_+3 actually respectively indicate positions of sectors existing backward by three, backward by two, backward by one, forward by one, forward by two and forward by three including entry packets, such syntaxes are represented as positions of entry packets in the following description. Moreover, while positions of sectors including entry packet are indicated by relative distances between sectors, they may be indicated by absolute positions, i.e., sector numbers themselves of disc.

The operation of the embodiment of FIG. 7 will now be described. Control section 80 receives entry point generation signal from video encoder 1 or video entry point detecting circuit 31 to insert entry packet immediately before video entry point (FIG. 9). Namely, when control section 80 receives input of entry point generation signal, it allows entry packet generating circuit 32 to generate entry packet, and to allow switching circuit 6 to be switched to input terminal E side to deliver it to header adding circuit 7 to multiplex it together with video data and audio data from code buffers 4, 5.

As shown in FIG. 10, in respective entry packets, positions of entry packets backward by three, backward by two, backward by one, forward by one, forward by two and forward by three are respectively recorded in entry_packet_−3, entry_packet_−2, entry_packet_−1, entry_packet_+1, entry_packet_+2 and entry_packet_+3. Positions of backward (past) entry packets (positions backward by three, backward by two and backward by one) are stored into entry point memory section 33, thus making it possible to recognize them at the time of recording current entry packets.

However, it is impossible to recognize positions of forward (future) entry packets at current time point. For this reason, at the time point of first delivering entry packet to DSM 10, data of entry packet that entry packet generating circuit 32 generates is caused to be dummy data. Control section 80 allows entry point memory section 33 to store all positions of entry points to read out positions of entry packets backward by three, backward by two, backward by one, forward by one, forward by two, and forward by three from entry point memory section 33 after multiplexing operations of all position data are completed (after recording operations onto disc of bit streams of video data and audio data have been completed) to deliver them to entry packet generating circuit 32. The entry packet generating circuit 32 generates, on the basis of these position information, entry_packet_−3, entry_packet_−2, entry_packet_−1, correct position information of entry packets. The control section 80 controls switching circuit 6 to deliver correct position information of entry packet to DSM 10 to record (write once) entry_packet_−3, entry_packet_−2, entry_packet_−1, entry_packet_+1, entry_packet_+2, entry_packet_+3 in respective corresponding entry packets on the disc.

Figure 11:
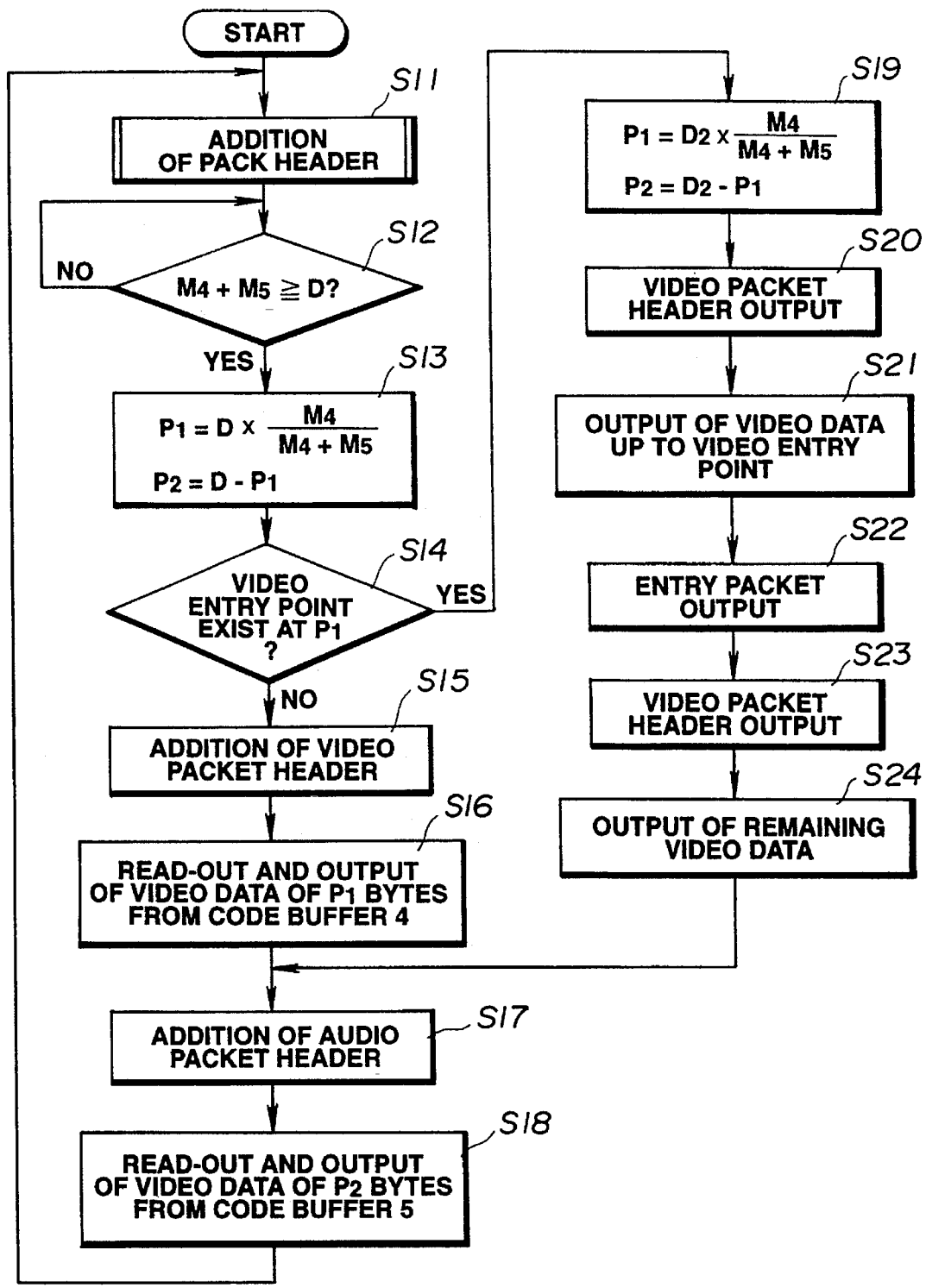
FIG. 11 is a flowchart for explaining the operation of the data encoding apparatus of FIG.

Moreover, video encoder 1 and audio encoder 2 respectively encode video signal and audio signal at variable rates, and control section 80 controls header adding circuit 7 to add pack header so that interval (length) of packs becomes equal to a predetermined number of bytes. To realize this, the control section 80 uses algorithm as shown in FIG. 11, for example, to control processing of addition of header, reading of code and insertion of entry packet. Here, for simplicity, the number of bytes of one sector is caused to be 2048 bytes and the number of bytes of one pack is caused to be the same 2048 bytes as that of the number of bytes of one sector. In this case, since position of pack represents position of sector, position information of entry packet is eventually represented by position information of pack.

Figure 5:
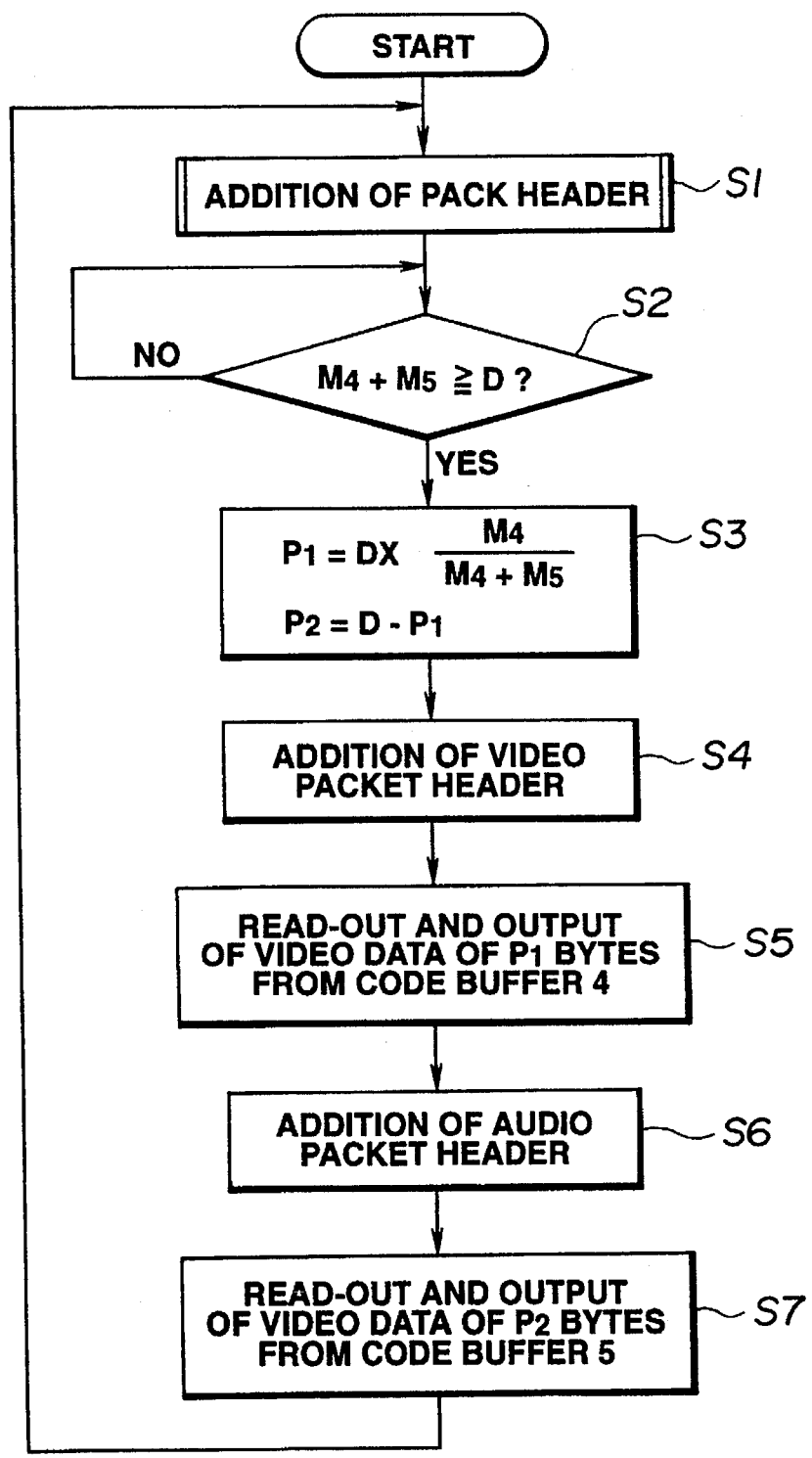
FIG. 5 is a flowchart for explaining the operation of the data encoding apparatus of FIG. 1.
Figure 6:
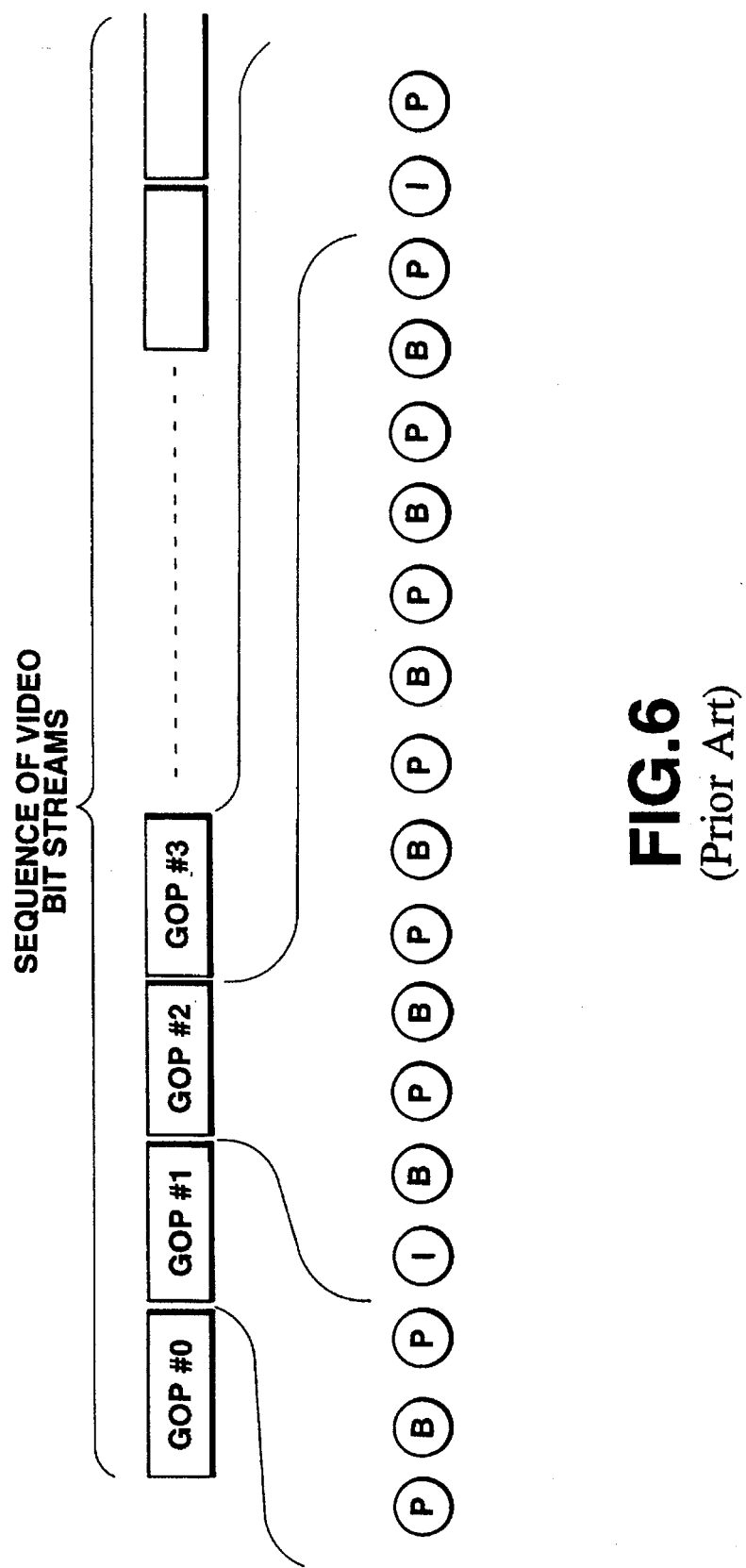
FIG. 6 is a view for explaining bit stream in disc driven by DSM 10 of FIGS. 1 and 2.

It is now assumed that, similarly to the case in the processing of FIG. 5, M4 is data quantity stored in code buffer 4 and M5 is data quantity stored in code buffer 5.

Moreover, D indicates total quantity of data included within one pack. It is now assumed that, for simplicity, D is caused to be constant, i.e., value obtained by subtracting size (capacity) of pack header, size of video packet and size of audio packet header from size of pack (2048 bytes). Moreover, D2 indicates total quantity of data within pack including entry packet, i.e., value obtained by subtracting size of entry packet and size of video packet header from D.

Initially, control section 80 instructs header adding circuit 7 to add pack header (step S11). Until sum of M4 and M5 is equal to quantity D of code data included within one pack, or is greater than that (step S12), control section 80 waits (step S12). Namely, until data contained within one pack is stored into code buffers 4, 5, control section 80 waits.

Then, control section 80 calculates, by the following formula, quantity P1 of video data contained within corresponding pack and quantity P2 contained within the corresponding pack (step S13). P1, P2 are defined as values obtained by allocating total quantity D of code data included within pack by ratio between data quantities M4, M5 of respective code buffers 4, 5.

$$P1 = D \times M4/(M4+M5)$$

$$P2 = D - P1$$

Then, the control section 80 confirms whether or not there exists video entry point in data up to the leading P1 bytes of data of M4 (step S14). In the case where no video entry point is included within pack, control section 80 instructs header adding circuit 7 to output video packet header (step S15). Then, the control section 80 reads out video data of P1 bytes from code buffer 4 to output it to DSM 10 (step S16). Similarly, the control section 80 adds audio packet header (step S17) to read out audio data of P2 bytes from code buffer 5 to output it to DSM 10 (step S18).

In the case where no video entry point is included within pack, the above-mentioned processing is repeated. This processing is similar to the processing in the case of FIG. 5.

On the other hand, in the case where video entry point, is included within pack, control section 80 allows entry point memory section 33 to first store position of current pack thereinto. Then, the control section 80 calculates, by the following formula, quantity P1 of video data contained within corresponding pack and quantity P2 of audio data contained therewithin (step S19).

$$P1 = D2 \times M4/(M4+M5)$$

$$P2 = D2 - P1$$

The reason why after operation at the step S13 is carried out, similar operation is carried out here is that capacity of data is reduced because entry packet is included within corresponding pack. It is now assumed that P1, P2 are values obtained by allocating D2 by ratio between data quantities M4, M5 of respective code buffers 4, 5.

Then, video packet header is outputted from header adding circuit 7 to DSM 10 (step S20). Subsequently, video data immediately before video entry point are outputted to DSM 10 through a path including video encoder 1, video entry point detecting circuit 31, code buffer 4, input terminal E1 and output terminal F of switching circuit 6, and header adding circuit 7, and is then recorded onto the disc (step S21). Then, entry packet is outputted by entry packet generating circuit 32, and is recorded onto the disc (step S22). It should be noted that position information of entry packet at this time is dummy data and relative position information of the entry packet is not written onto the disc.

Thereafter, video packet header is outputted and recorded for a second time (step S23), and the remaining video data is outputted and recorded (step S24). Then, processing operation proceeds to steps S17, S18. At these steps, audio packet header is added and audio data of P2 bytes is recorded.

At the time point when algorithm of FIG. 11 is repeated and input to video encoder 1 and audio encoder 2 disappears, position information of entry packet is written into the entry packet already recorded on the disc. Namely, control section 80 reads out position of pack including entry packet from entry point memory section 33 to write relative positions of packs including respective three entry packets before and after into respective entry packets of disc of DSM 10.

Moreover, while, in the above-described example, at the time of first delivering entry packet to DSM 10, data of entry packet are caused to be dummy data, with respect to information of positions of backward (past) entry packets (positions backward by three, backward by two and backward by one), they may be correct position information entry_packet_−3, entry_packet_−2, entry_packet_−1 from the time point of first, sending entry pack to DSM 10.

Meanwhile, since it, is impossible to recognize position of (future) entry packet, existing at the succeeding (forward) position as described above, it, is necessary to write them once into entry packet existing in multiplexed bit stream of DSM 10 after all multiplexing operations are completed with respect to at least these position information.

However, in the case where entry point memory section 33 hardly has capacity or have not capacity at all, since it is possible to hardly hold position information of entry packet existing at the succeeding (forward) position, or it is impossible to hold such information by any means, it is impossible to write it once into entry packet in the multiplexed bit stream recorded in DSM 10. Moreover, in the case there entry packet memory section 33 has not capacity at all, it is impossible to write position information of entry packet entry_packet_−3, entry_packet_−2, entry_packet_−1 existing at the preceding (backward) position at the time of first sending entry packet to DSM 33. In such a case, since value included in position information of entry packet in the completed multiplexed bit stream is not correct value, there is the possibility that any unexpected operation may take place in the case where search is carried out on the basis of such a value.

In view of the above, in this embodiment, flag (enable_flag) indicating validity of position information of entry packet is provided. In actual terms, the form of entry packet generated from entry packet generating circuit 32 is caused to be the form shown in FIG. 10. The form of FIG. 10 is a method in which validity of position information of all entry points included within corresponding entry packet are represented by one 1 bit flag. Moreover, in place of entry packet of FIG. 10, the form of the entry packet of FIG. 12 may be used. The case of FIG. 12 is a method in which flags indicating validity are added every entry points.

In the case where entry packet of the form of FIG. 10 is used, at the stage of carrying out multiplexing to first send multiplexed bit stream to DSM 10, since position information of entry packet cannot be written in complete state, O signifying "invalid (null)" is set to valid flag Enable Flag of position information of corresponding entry packet to record it into DSM 10. After recording operations of all multiplexed data are completed, in carrying out write once operation into the entry packet by using position information of the entry packet stored in entry point memory section 33, with respect to entry packets into which all position information could be written, control section 80 updates Enable Flag existing in the corresponding packet into 1 signifying "valid".

Figure 12:
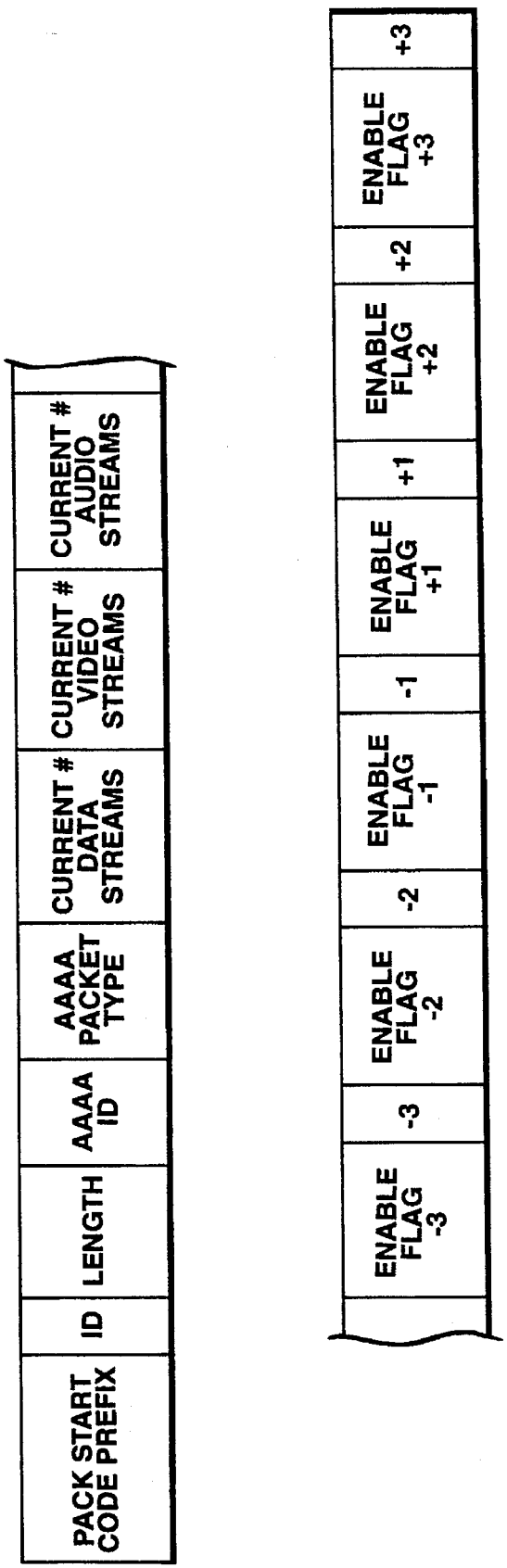
FIG. 12 is a view for explaining another embodiment of the format of entry packet of this invention.

In the case where the entry packet of the form of FIG. 12 is used, at the stage of carrying out multiplexing to first send multiplexed bit stream to DSM 10, 1 indicating "valid" is set to valid flags corresponding to position information which could be written in of valid flags of Enable Flag −3~Enable Flag +3, and indicating "invalid" is set to valid flags corresponding to position information which could not be written in thereof to record them into DSM 10, After recording operations of multiplexed data have been completed, in carrying out write-once operation into entry packet by using position information of entry packet stored in entry point memory section 33, control section 80 updates, with respect to position information which could be written once, corresponding valid flag into 1 signifying "valid".

When, in FIG. 12, enable_flag_N and entry_packet_N (−3≦N≦+3) is assumed to be continuous bit train and one number is assumed to be represented by this bit train, this is equivalent to the fact that validity of corresponding value is represented by entry packet position information itself in place of providing position information valid flag of entry packet. Namely, in the case where valid position information cannot be written, an approach is employed to write in advance a value within a specific range or invalid value as position information, thus making it possible to realize the function identical to addition of position information valid flag. In the case where a specific value is written into position information of entry packet to thereby indicate that respective entry points are invalid, it is possible to provide plural kinds of specific values indicating invalid, For example, with respect to the case where information of corresponding entry point is invalid because recording of position information of entry point merely fails to be carried out and the case where it is intentionally inhibited to move read-out position to the entry point, writing is carried out into entry packet by different values, thereby making it possible to inform the data decoding apparatus of that fact.

Data decoding apparatus adapted for carrying out search operation by making use of enable_flag as shown in FIG. 10 or 12 will now be described with reference to FIG. 8. At the time of normal reproduction, header separating circuit 22 of separating unit 21 separates pack header, packet header and entry packet from data which have been read out from DSM 10 to deliver them to control section 60, and to deliver time-division multiplexed data to input terminal G of switching circuit 23. Output terminals H1, H2 of the switching circuit 23 are respectively connected to input terminals of video decoder 25 and audio decoder 26. The control section 60 allows input terminal G and output terminals H1, H2 of switching circuit 23 to be successively in connecting state in accordance with stream_id of packet header delivered from header separating circuit 22 to correctly separate the time-division multiplexed data to respectively deliver video data and audio data to video decoder 25 and audio decoder 26.

Moreover, the control section 60 reads out information relating to entry point (information of entry packet) from data inputted from header separating circuit 22 to deliver it, to entry point memory section 41 to allow it to store that, information. Since information of current read-out position, e.g., sector No. of disc of DSM 10 is delivered from DSM 10 to the control section 60, entry point memory section 41 can Store position of entry packet, and its content in a manner to be in correspondence with read-out position of DSM 10. At this time, control section 60 deliver information to entry point memory section 41 so as to include enable_flag shown in FIG. 10 or 12, Thus, entry point memory section 41 also stores it.

The operation in the case where search operation of the data decoding apparatus of FIG. 8 is instructed will now be described. Initially, main control section (not shown) instructs control section 60, video decoder 25 and audio decoder 26 to carry out, shift to search mode. The control section 60 extracts, on the basis of current read-out position information delivered from DSM 10, entry packet information in the vicinity of the position from entry point memory section 41. At this time, the control section 60 judges validity of position information of entry packet from enable_flag stored in the entry point memory section 41. In the case where position information is invalid, the control section 60 does not instruct DSM 10 to carry out search operation on the basis of that information, but, extracts different entry packet information from memory section 41. In the case where, from position information of different entry point or the like, position of that entry point can be calculated by interpolation or estimation, etc., DSM 10 may be caused to undergo search to the position of the entry point determined in that way.

When control section 60 determines position information of valid entry packet, it, sends search instruction to DSM 10, thus to allow read-out position to be moved, at a high speed, to sector including that entry point. When movement is completed, DSM 10 reproduces data from the sector including that entry point to deliver it to separating unit, 21. As has been described with reference to FIG. 9, entry packets are disposed (allocated) immediately before video data in which I picture is recorded. Accordingly, when video data subsequent to entry packet is separated by header separating circuit 22 and is delivered to video decoder 25, the first picture of the video data has been I picture. The video decoder 25 immediately decodes I picture which has first appeared to output it. In the search mode, audio decoder 26 is caused to be in mute statue.

Since position information of respective three entry points before and after are recorded in entry packets, control section 60 repeats an operation to search a sector including the next entry packet from that position information to reproduce it. Thus, I pictures are rapidly and successively reproduced.

The control selection 60 is operative so that when designated search speed is high, it, provides an access to a more remote entry point, while when designated search speed is low, it provides an access to nearer entry point. Since three entry points are respectively recorded in forward and backward directions, it is possible to have variation of search speed of three stages or more by combination of entry points selected.

While relative positions of entry points backward by three, backward by two, backward by one, forward by one, forward by two, and forward by three of respective entry packets are recorded, by the number of sectors, in entry_packet_−3, entry_packet_−2, entry_packet_−1, entry_packet_+1, entry_packet_+2 and entry_packet_+3, it, is not, necessarily required that relative positions of entry points written here are positions of entry points of positions of −3, −2, −1, +1, +2, +3 with respect, to the entry packets. For example, relative positions of arbitrary entry packets may be also recorded in a manner of −25, −8, −1, +1, +5, +20

.

Thus, it, is possible to change relative positions of entry points to be written every recording apparatuses, every multiplexed data and/or every entry packets in dependency upon various characteristics such as kind of recording media, signal form of multiplexed bit stream and the property of video or audio data to be multiplexed, etc., thus making it, possible to adjust, such speed For example, in multiplexed bit, stream prescribed by ISO11172 (MPEG), the number of pictures from I picture to the next I picture is changeable. In such a case, in the case where entry points of positions of −3, −2, −1, +1, +2, +3 are always written in entry packets, speed of search reproduction with respect to real time reproduction would vary in bit stream where. the numbers of pictures (frames) between I pictures are different. However, an approach is employed to allow relative positions of entry points to be adjustable in correspondence with the number of pictures between I pictures to record them into entry packets to thereby adjust search speed, thus making it possible to realize a fixed search reproduction speed between bit streams in which the numbers of pictures (frames) between I pictures are different.

It is not necessarily required that relative positions of entry points written in position information of entry packets are positions of entry points of positions of −3, −2, −1, +1, +2, +3 with respect to the entry packets. For example, relative positions of arbitrary entry packet may be recorded in a manner of −25, −8, −1, +1, +5, +20. In the case of carrying out special reproduction such as slow reproduction operation in forward and backward directions or frame feed reproduction operation, etc., there are instances where positions of entry points of positions of −1, +1 before and after may be required.

In view of the above, with respect to bit stream for which such special reproduction is required, limitation may be provided in position of entry point recorded in entry_packet_−1, entry_packet_+1 to respectively write positions of entry points of positions of −1, +1 before and after.

As previously explained, in the case of recording position information of entry points existing forward or backward by arbitrary number (of entry points) into entry packet, in such cases of recording relative positions of entry packets backward, e.g., by −25, −8, −1, +1, +5, +20, when entry packet of a form as shown in FIG. 10 or 12 is employed, a data decoding apparatus as shown in FIG. 8 cannot discriminate positional shift between those position information of entry points freely written and position information of entry point positioned forward or backward by arbitrary number of entry points. Accordingly, in the case where those relative position information are used for search operation, there is the problem that it is impossible to predict what search speed can be realized.

Figure 13:
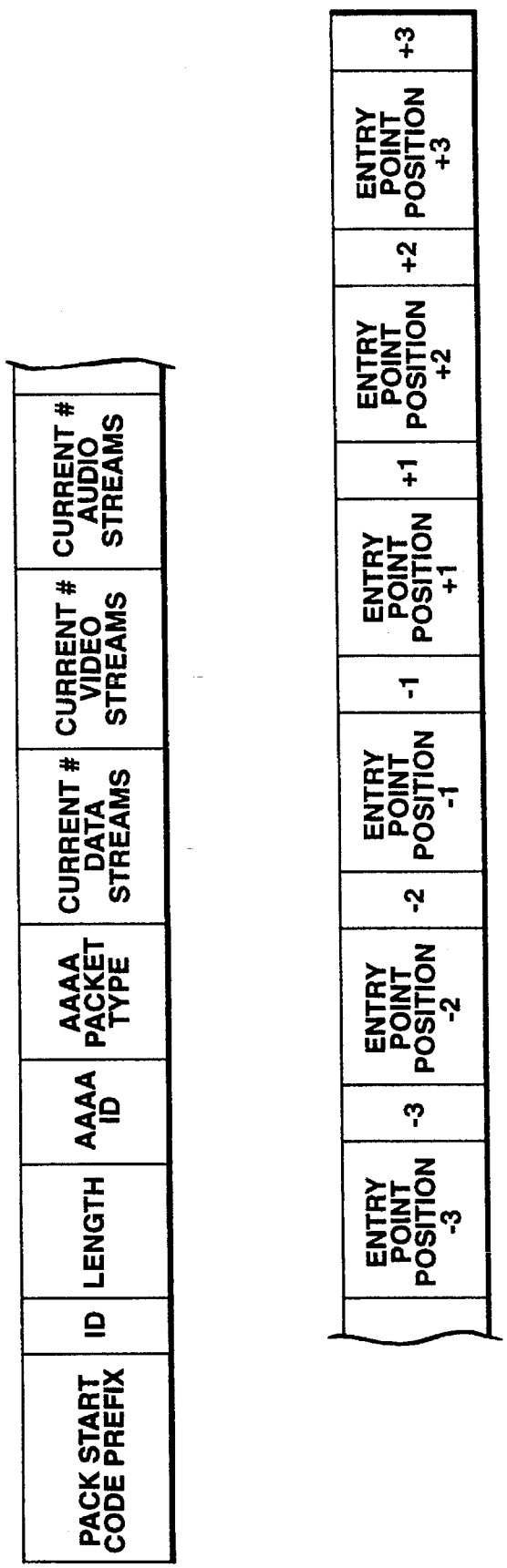
FIG. 13 is a view for explaining a further embodiment of the format of entry packet of this invention.

In view of the above, the entry packet is caused to be a form as shown in FIG. 13 and it may be also possible to record, into entry packet, entry point interval information Entry Point Position −3, Entry Point Position −2, Entry Point Position −1, Entry Point Position +1, Entry Point Position +2, Entry Point Position +3 indicating positional shifts of entry points in forward or backward d1 reaction indicated by entry_packet_−3, entry_packet_−2, entry_packet_−1, entry_packet_+1, entry_packet_+2, entry_packet_+3.

For example, in the case of respectively recording position information of entry points existing in forward directions by −25, −8, −1, +1, +5, +20 in entry_packet_−3, entry_packet_−2, entry_packet_−1, entry_packet_+1, entry_packet_+2, entry_packet_+3, −25, −8, −1, +1, +5, +20 are respectively recorded in Entry Point Position −3, Entry Point Position −2, Entry Point Position −1, Entry Point Position +1, Entry Point Position +2, Entry Point Position +3. It is to be noted that while interval of entry point is represented with the number of entry points being as a unit, such interval may be represented with time, the number of pictures or the number of frames being as a unit.

Figure 14:
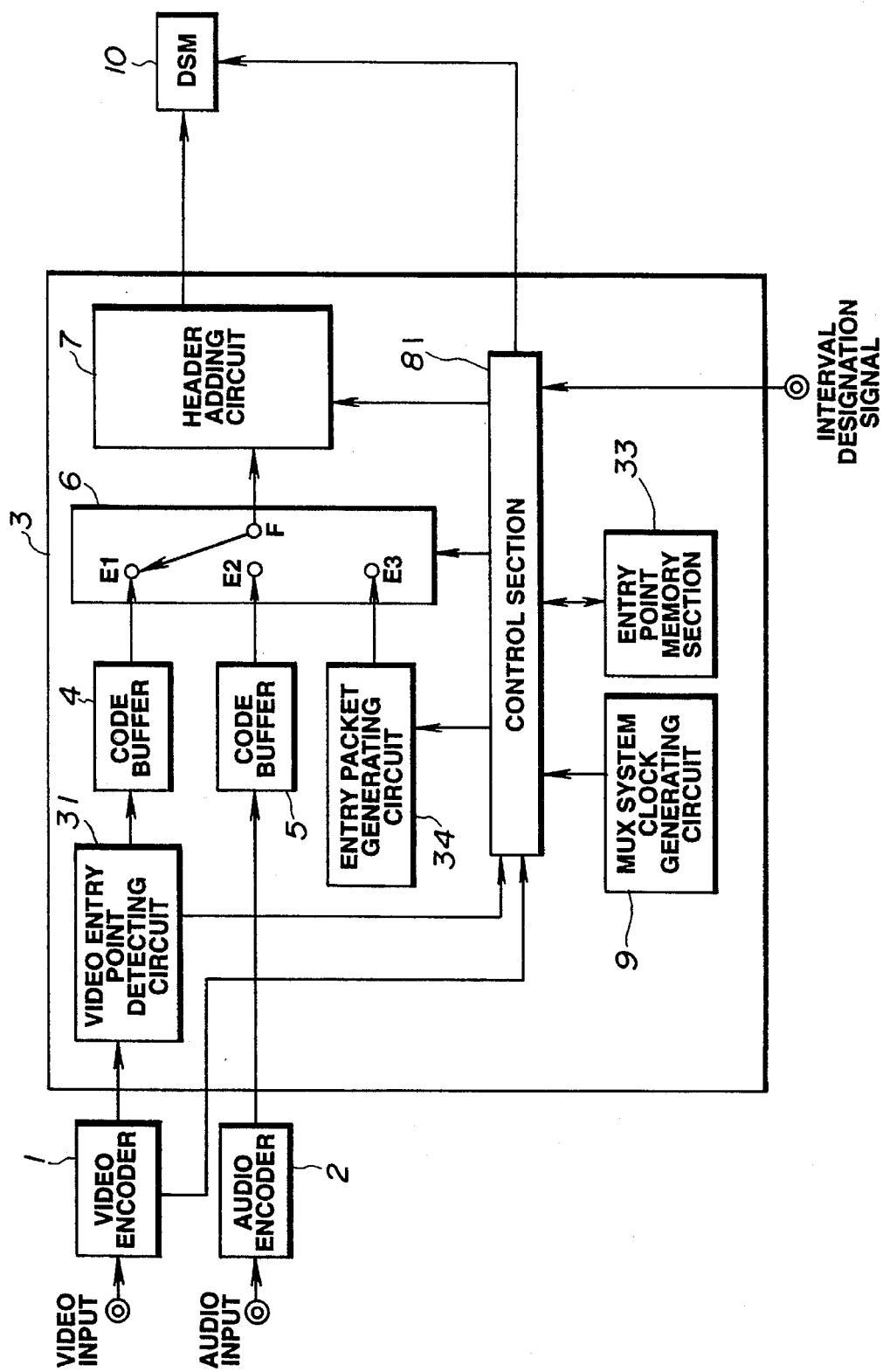
FIG. 14 is a block diagram showing the configuration of another embodiment of the data encoding apparatus to which this invention is applied.

FIG. 14 is a block diagram showing the configuration of a data encoding apparatus adapted for generating such an entry packet. While the fundamental configuration is similar to that of FIG. 7, the operations of entry packet generating circuit 34 and control section 81 are different. Interval designation signal which designates interval of entry point is inputted from input section (not shown) to control section 81. Similarly to the case of FIG. 7, control section 81 receives entry point generation signal from video entry point detecting circuit 31 to control entry packet generating circuit 34 to generate entry packet comprised of dummy data. When multiplexing operations of all data have been completed, control section 81 extracts position information of entry point corresponding to the interval designation signal from position information of entry point stored in the entry point memory section 33 to deliver it to entry packet generating circuit 34. At this time, control section 81 also delivers interval designation signal to entry packet generating circuit 34. The entry packet generating circuit 34 generates, on the basis of position information and interval designation signal of respective entry points, entry_packet_−3, entry_packet_−2, entry_packet_−1, entry_packet_+1, entry_packet_+2, entry_packet_+3, and Entry Point Position −3, Entry Point Position −2, Entry Point Position −1, Entry Point Position +1, Entry Point Position +2, Entry Point Position +3. The control section 81 controls switching circuit 6 to deliver this information to DSM 10, and controls DSM 10 to write once these information into respective corresponding entry packets.

Figure 15:
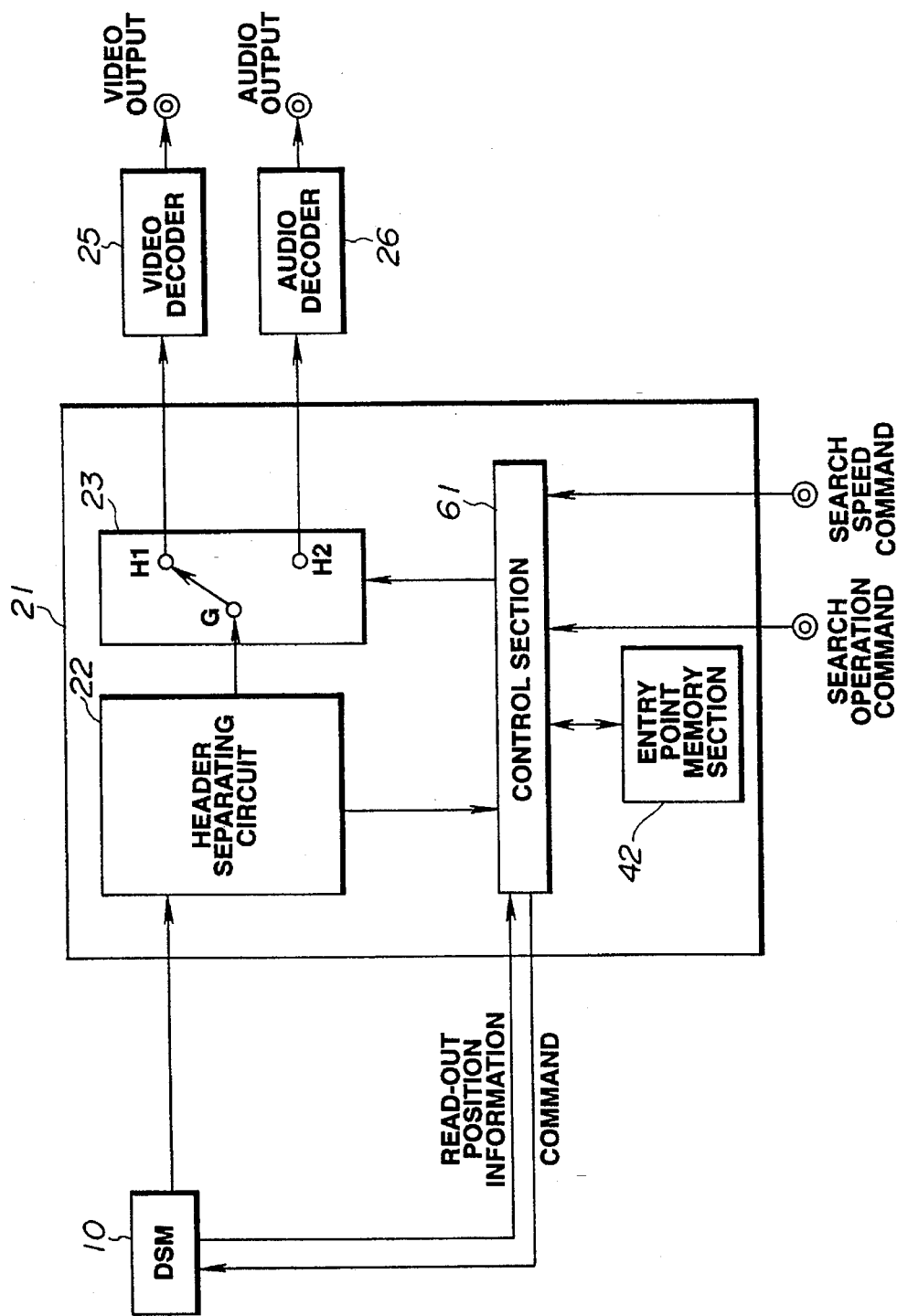
FIG. 15 is a block diagram showing the configuration of another embodiment of the data decoding apparatus of this invention.
Figure 17:
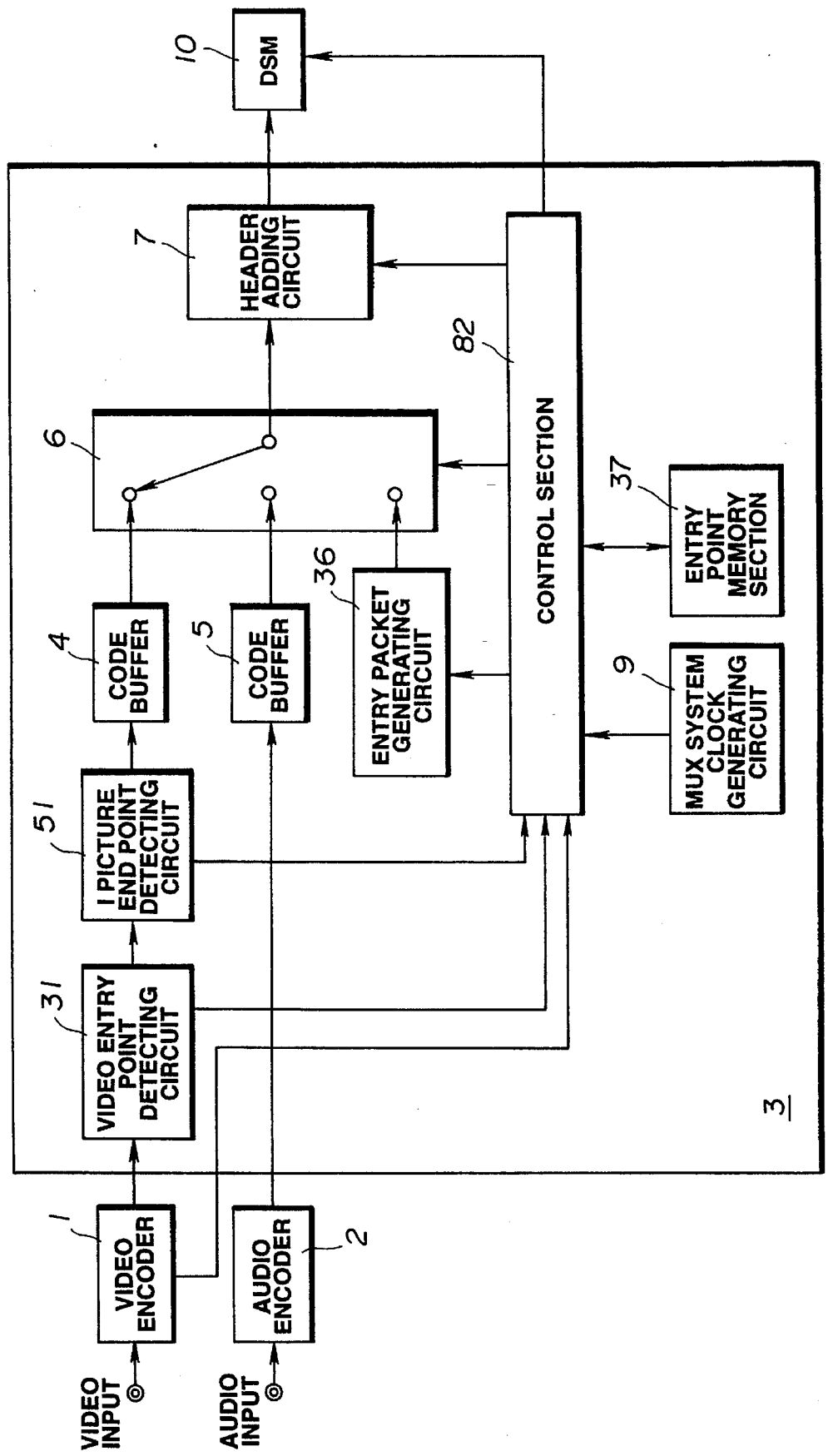
FIG. 17 is a block diagram showing the configuration of a further embodiment of the data encoding apparatus to which this invention is applied.

FIG. 15 is a block diagram showing the configuration of a data decoding apparatus adapted for carrying out search by using information up to such Entry Point Position −3~+3. The fundamental configuration is similar to that of FIG. 8.

At the time of normal reproduction, header separating circuit 22 discriminates entry packet from multiplexed bit stream sent from DSM 10 to send the content of entry packet to control section 61. The control section 61 sends position information of entry packet (entry_packet_−3, entry_packet_−2, entry_packet−1, entry_packet_+1, entry_packet_+2, entry_packet_+3) and interval information thereof (Entry Point Position −3, Entry Point Position −2, Entry Point Position −1, Entry Point Position +1, Entry Point Position +2, Entry Point Position +3) to entry point memory section 42 to store it thereinto. Then, target value of search speed is given from main control section (not shown) to control section 61 and search operation is instructed thereto. The control section 61 detects a speed required for realizing a speed closest to the designated search speed of interval information Entry Point Position −3, Entry Point Position −2, Entry Point Position −1, Entry Point Position +1, Entry Point Position +2, Entry Point Position +3 of entry packet information stored in the entry point memory section 42. Further, control section 61 selects position information corresponding to detected interval information from entry_packet_−3, entry_packet_−2, entry_packet_−1, entry_packet_+1, entry_packet_+2, entry_packet_+3 stored in the entry point memory section 41. The control section 61 instructs DSM 10 to carry out search operation to entry point by using position information of entry packet selected in this way.

As stated above, interval information indicating that position information of respective entry packets indicate how many number of positional shifts of entry points are in forward direction or in backward direction are used, thereby making it possible to select entry packet position information which realizes, with respect to all desired search speeds, a search speed closest thereto.

Figure 16:
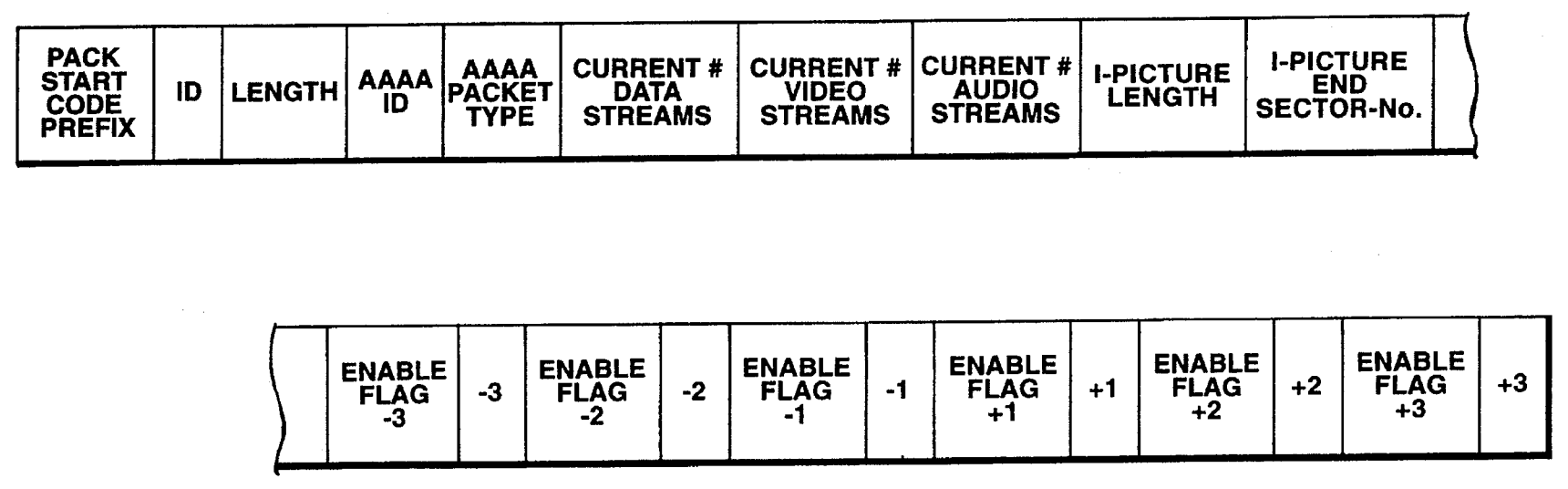

Entry packet may be in a form as shown in FIG. 16, and size of data (byte No.) of I pictures I-picture length immediately after corresponding entry point, position of pack in which termination of data of the I picture is multiplexed I-picture END sector_No., or both data thereof may be also recorded into entry packet.

The configuration of a data encoding apparatus adapted for recording I-picture length, I-picture END sector_No. into entry packet is shown in FIG, 17. It is to be noted that the same reference numerals are respectively attached to the same components as those of FIG. 7 and their explanation is omitted for the brevity.

I picture end point detecting circuit 51 has a function to search termination of data of I picture from bit stream sent from video encoder 1 to inform control section 82 of generation timing of that termination. The entry point memory section 37 has a function to hold position of entry packet, length of data of I picture (I-picture length) subsequent immediately after that entry packet, and position information of sector I-picture END sector_No. in which termination of data of that I picture is multiplexed Length of data of I picture (I-picture length) is determined in a manner as described below. Control section 82 obtains generation timing of entry point from video encoder 1 or video entry point detecting circuit 31, and obtains generation timing of end point of data of I picture subsequent immediately after that entry point from I picture end point detecting circuit 51. Since the position of entry point is the position of start point of data of I picture, control section 82 calculates difference between generation timing of end point of data of I picture and generation timing of entry point to convert it into the number of bytes to thereby calculate length of data of I picture (I-picture length). The control section 82 delivers the I-picture length thus obtained to entry point memory section 37, and stores it thereinto.

Since there is the possibility that length (capacity) of data of I picture is greater than memory capacity of code buffer 4, there are instances where, at the time of first multiplexing entry packets to write it into DSM 10, length of data of I picture (I-picture length) to be written into that entry packet may not be yet calculated. In such a case, entry packet generating circuit 36 generates 0 or specific value indicating calculation which is not yet performed with respect to the position of I-picture of entry packet. Accordingly, at this stage, entry packet including dummy I-picture length is recorded on the disc of DSM 10. The control section 82 delivers, at the time point when length of data of I picture has been calculated, length of data of I picture (I picture length) to entry point memory section 37 to store it thereinto to deliver value of I-picture length to DSM 10 at the time of carrying out write once operation into entry packet later to record it.

Moreover, position of termination of pack in which data of I picture are multiplexed (I-picture END sector_No. ) is determined in a manner as described below. Control section 82 multiplexes data by the algorithm shown in FIG. 11 by data quantities M4, M5 stored in code buffers 4 and 5. In this case, control section 82 judges, separately from the processing described in the algorithm shown in FIG. 11, whether or not end point of data is included in video data of corresponding sectors every respective sectors. In the case where end point of data of I picture is included within corresponding sector, the control section 82 allows entry point memory section 37 to store position of that sector. The entry point memory section 37 stores that position data in a manner to become in correspondence with data written into entry packets multiplexed immediately before that I picture.

With respect to position of sector included at terminating position of data of I picture (I-picture END sector-No.) stored in the entry point memory section 37, its value is delivered to DSM 10 when write once operation of entry packet is carried out similarly to length of data of I picture (I-picture length). In this instance, I-picture END sector-No. is written into DSM 10 by position of sector where multiplexing of data of that I picture is started, i.e., relative distance (No. of sectors) from position of sector where entry packets are multiplexed.

An example of a data decoding apparatus adapted for carrying out high speed search by using I-picture END sector-No. and I-picture length written into entry packet in this way will now be described with reference to FIG, 18.

Meanwhile, video decoder based on ISO11172 (MPEG) has video code buffer within the decoder in order to guarantee decode operation also with respect to bit streams such that quantities of data are different every pictures. Bit stream incoming to video decoder 25 is first once into video code buffer and is then decoded at a necessary timing.

Hitherto, in order to continuously reproduce I picture, control section 62 performed an operation to monitor whether or not decode of I picture by video decoder 25 has been completed to issue search command of the next I picture to DSM 10 after completion of decode has been confirmed, In the case where video decoder 25 has video code buffer at this time, at the stage where decode section of video decoder 25 has completed decode of I picture, data of P, B pictures multiplexed subsequently to I picture are stored in video code buffer of the video decoder 25. Although those data are not decoded, such data are placed in the state where they are read out. In many cases, since speed of search is governed by the time required for reading out data from DSM 25 rather than the time required for decoding of video decoder 25, speed of search is lowered by load of useless P, B pictures.

In this embodiment, by using I-picture END sector-No. information written in the entry packet, useless read-out quantity of P, B pictures can be held down to the minimum level and data of I picture to be displayed next can be read, in advance, into the video code buffer within video decoder 25. Accordingly, in a data decoding apparatus such that search speed is governed by read-out speed from DSM 10, higher speed search operation can be realized. The operation thereof will be described below.

During search operation, control section 62 instructs DSM 10 to carry out search on the basis of position information of entry packets before and after recorded in entry packet. The DSM 10 reads out multiplexed bit steam from designated position (sector) to send it to header separating circuit 70. When the header separating circuit 70 detects entry packet in the multiplexed bit stream thus sent, it generates interruption signal to inform control sect, ion 62 of it. The control section 62 receives this interruption signal to detect sector No. of current sector which is being read out of DSM 10 to store it as position of current entry point into entry point memory section 43.

Simultaneously with this, the control section 62 takes out position information of entry point written in the entry packet from the header separating circuit 70 to store it into entry point memory section 43. As described above, since I-picture END sector-No. is written into the entry packet by relative position (No. of sectors) from the leading sector position of current entry point, the control section 62 adds I-picture END sector_No. to position information of current entry point which has been read out from DSM 10 and has been stored into entry point memory section 43 to thereby convert relative position information into absolute position information (sector No.). The entry point memory section 43 stores this absolute position information along with information of other entry packets.

According as DSM 10 continues delivering multiplexed bit stream to header separating circuit 70, sector No. of sector which is read by DSM 10 increases with time. The control section 62 reads out sector No. from DSM 10 by a fixed period to compare it with I-picture END sector-No. converted into absolute position information stored in entry point memory section 43. At this time, in the case where sector No. obtained from DSM 10 is above sector No. that I-picture END sector-No. converted into absolute position information indicates, the control section 62 judges that necessary read-out operation of necessary I pictures is completed and unnecessary data such as P, B pictures subsequent to I picture are loaded to immediately instruct DSM 10 to conduct a search for reading thereinto the next I picture.

Figure 18:
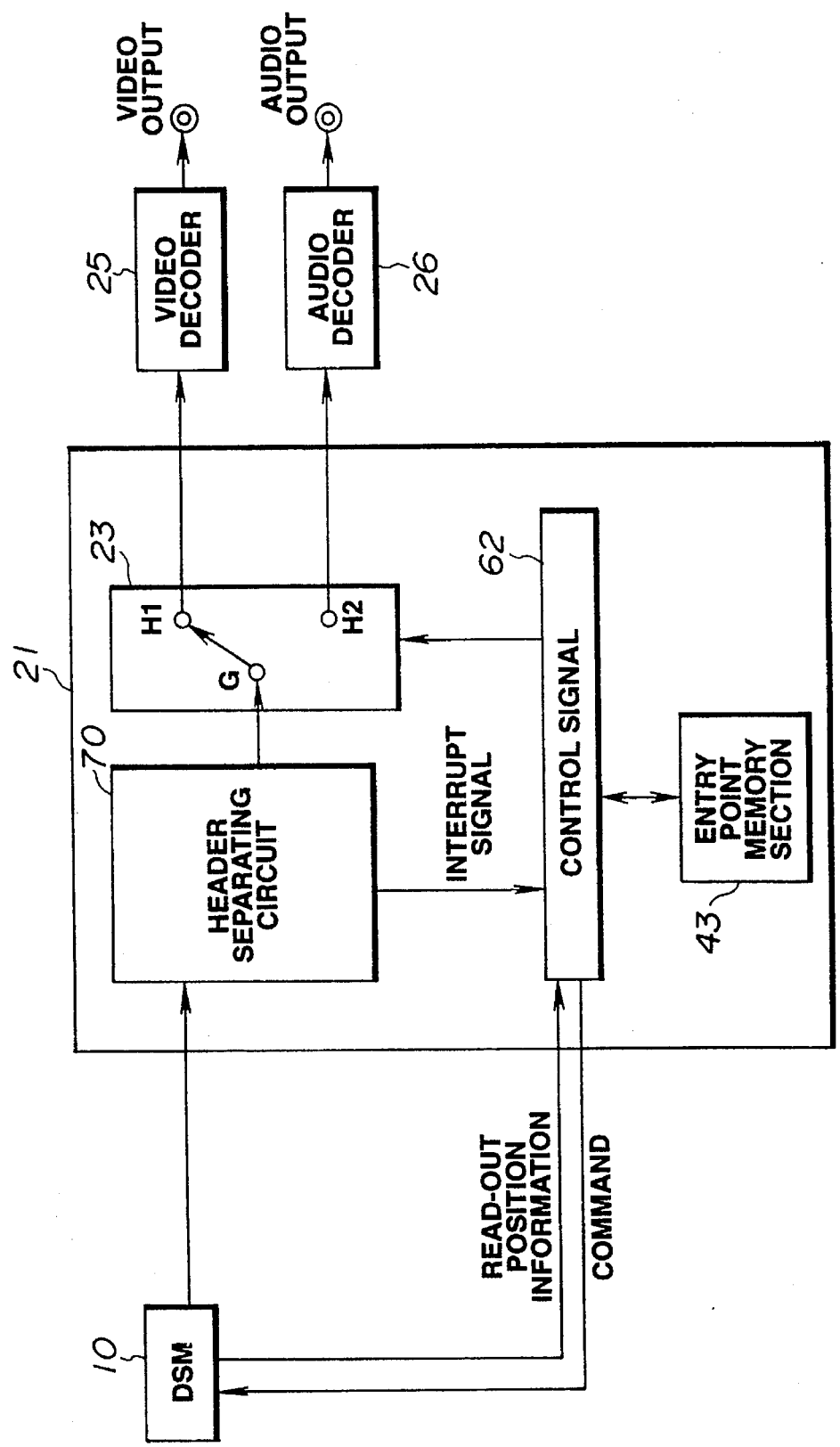
FIG. 18 is a block diagram showing the configuration of a further embodiment of the data decoding apparatus of this invention.

Moreover, the data decoding apparatus of this embodiment can carry out search by more constant search speed by using size of data of I picture (I-picture length) written in the entry packet, or position of pack where terminations of I picture data are multiplexed (I-picture END sector-No.). In the case where the operational mode enters the search operation, the control section 62 shown in FIG. 18 reads, from DSM 10 thereinto, sector including the leading portion of data of I picture on the basis of position information of entry point stored in the entry packet. Since entry packets are necessarily multiplexed in the sector thus read thereinto, it is possible to read out length of data of I-picture or quantity of sectors to be read in from I picture length, I-picture END sector-No. written therein. The control section 62 judges whether or not I-picture length or I-picture END sector-No, written in the entry packet is above a certain threshold value. Further, in the case where I-picture length or I-picture END sector-No. is above a certain threshold value, the control section 62 judges how many I pictures above the threshold value are continuous. In the case where I pictures of which data quantity is above the threshold value are continuous by a predetermined number of pictures or more, it takes much time for read-out of data from DSM 10 or decode processing by video decoder 25 and it can be therefore estimated that search speed has become low. Accordingly, the control section 62 temporarily carries out stop of decode of I picture or alteration (change) of entry point to be selected of entry points of −3∼+3 thus to make a correction. Stop of decode of I picture is realized by instructing DSM 10 to conduct search to the next entry point before data is delivered to video decoder 25 and audio decoder 26. Alteration (change) of position of entry point to be selected is realized by allowing DSM 10 to search entry point to carry out a search higher than that of the search which has been carried out until now in carrying out search of the next I picture. For example, if search using, e.g., entry_packet_+2 is being carried out, this search is temporarily changed into search using entry_packet_+3.

In the case where search speed is temporarily lowered by the above-mentioned procedure, search operation immediately thereafter is temporarily omitted or is caused to be conducted at higher speed, thus making it possible to realize search close to more constant speed.

Figure 19:
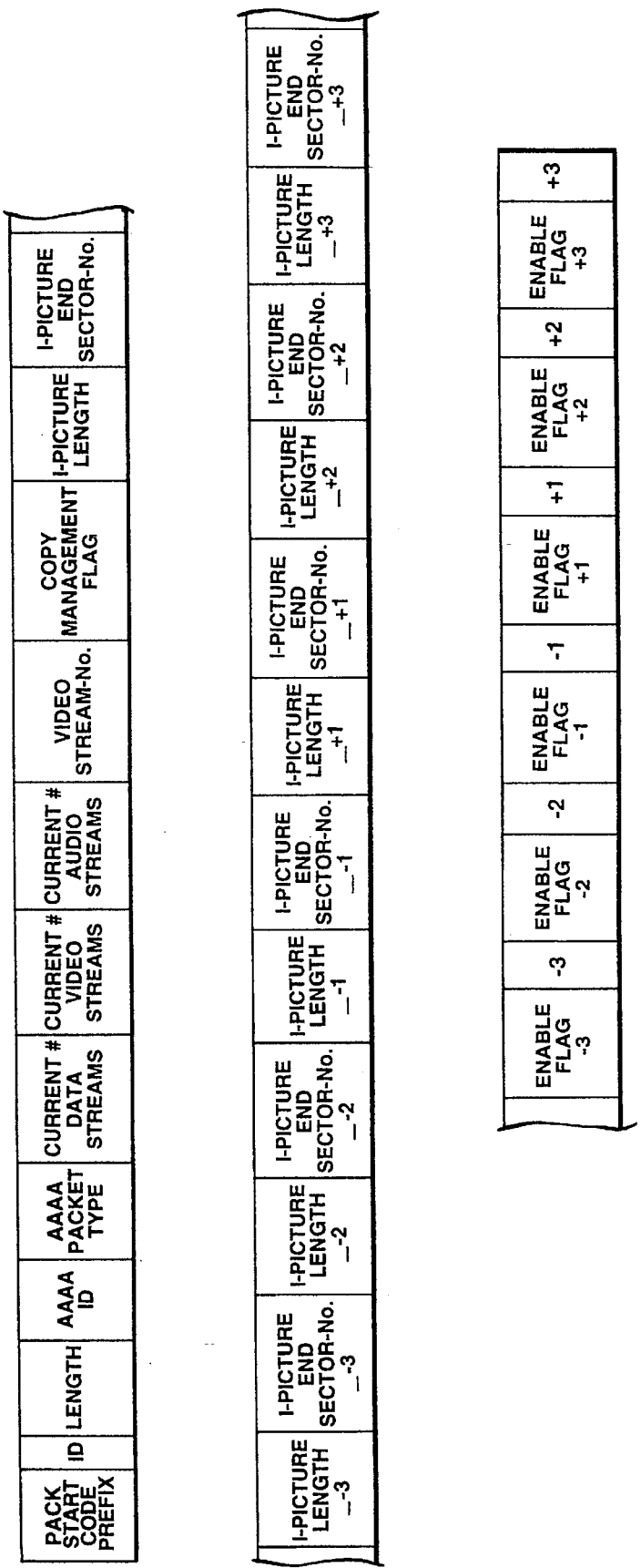
FIG. 19 is a view for explaining a still more further embodiment of the format of entry packet of this invention.

Moreover, the form of entry packet is caused to be as shown in FIG. 19 and not only I-picture length, I-picture END sector-No. relating to I picture subsequent to the entry packet, but also I picture length, I-picture END sector-No. relating to I picture subsequent to the entry packets indicated by entry_packet_−3~entry_packet_+3 may be recorded into entry packet. Namely, I-picture length_−3~I_picture length_+3, I picture END sector_No._−3~I-picture END sector-No._+3 are written into the entry packet.

Thus, when the control section of the data decoding apparatus can recognize, when it reads thereinto new I picture, length of that I picture or position of termination on the disc of DSM 10 before it reads thereinto entry packets multiplexed immediately before that I picture. Accordingly, a higher speed search can be realized.

Further, in the embodiment of the entry packet shown in FIG. 19, video stream No. is recorded into the entry packet. Video data up to 16 at the maximum are permitted to be multiplexed in the multiplexed bit stream prescribed in ISO11172 (MPEG). When it is assumed that a plurality of video steams are multiplexed in one multiplexed bit stream and search operation is carried out with respect to two multiplexed video streams or more, since positions of entry points are different by respective video streams, it is necessary to record entry point information with respect to respective bit streams In the form of the conventional entry packet, only entry packet with respect to one video stream could be multiplexed. However, by recording Video stream_No. information into entry packet to multiplex entry packets with respect to respective video streams, the data decoding apparatus can select entry packet with respect to necessary video stream. Also in multiplexed data where a plurality of video streams are multiplexed, search operation can be realized with respect to an arbitrary video stream.

Further, in the embodiment of the entry packet shown in FIG. 19, Copy Management Flag is recorded. Copy Management Flag serves to realize the same role as that of SCMS (Serial Copy Management System) employed in CD (Compact Disc) or DAT (Digital Audio Tape), and is flag for designating that copy which is not intended by maker of multiplexed data is disabled (inhibited). Moreover, Copy Management Flag is permitted to record not only information indicating whether or not copy is inhibited, but also information indicating how many number of times of copy operations are permitted. Thus, a procedure is permitted to copy bit stream to prepare duplicate (reproduction), but a procedure is prohibited to prepare a further duplicate (reproduction) based on the reproduction, i.e., duplicate by second hand copy. From facts as described above, it is possible to clearly indicate bit stream for which copy is desired to be inhibited because copyright is claimed, or the like with respect to the data decoding apparatus or equipment connected thereto.

Figure 20:
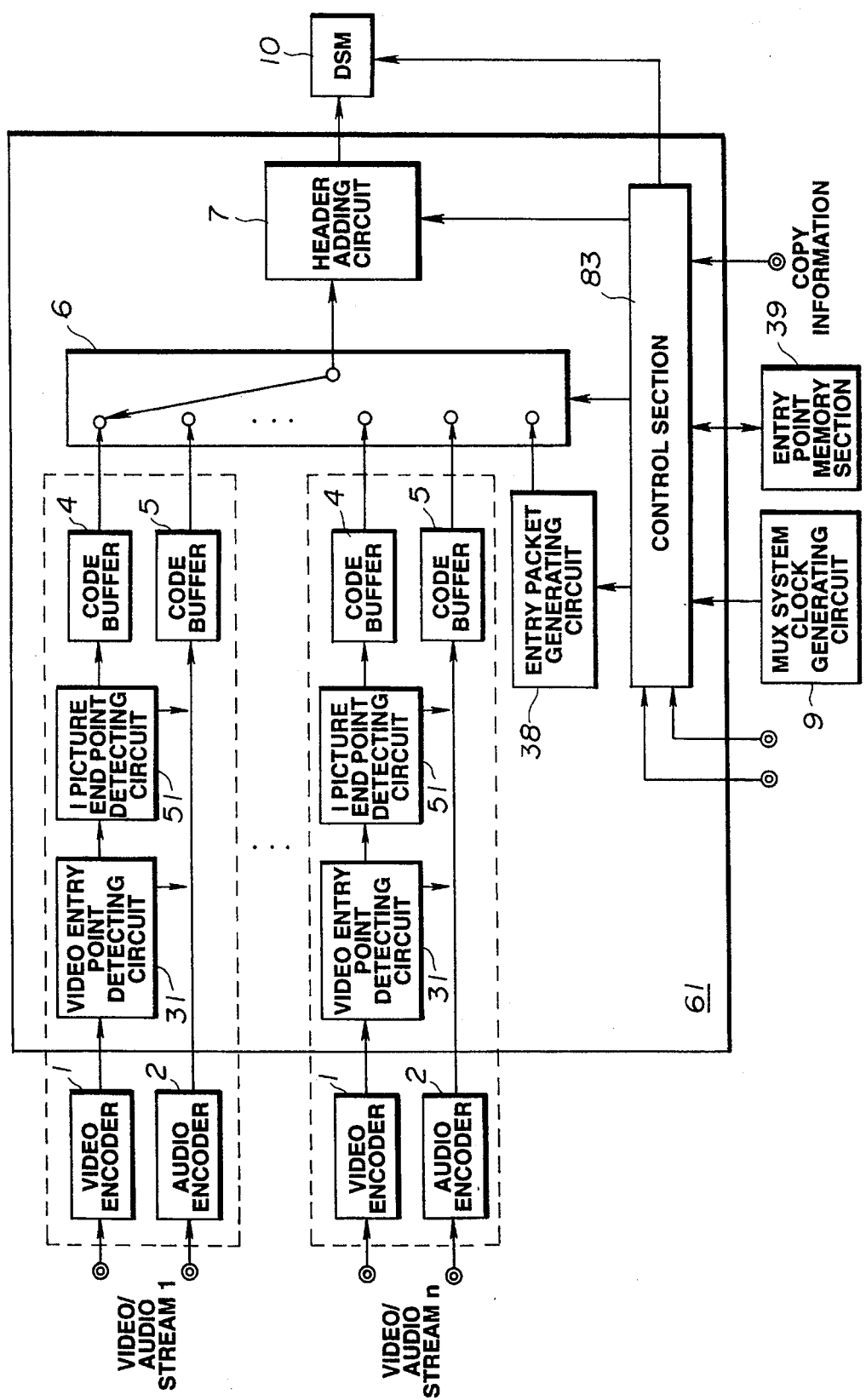
FIG. 20 is a block diagram showing the configuration of a still further embodiment of the data encoding apparatus to which this invention is applied.

FIG. 20 is a block diagram showing the configuration of a data encoding apparatus adapted for forming such multiplexed bit streams. In the data encoding apparatus shown in FIG. 20, there respectively n number of video encoders 1, video entry point detecting circuits 31, I picture end point detecting circuits 51, and code buffers 4 and 5. In the case of such data encoding apparatus, control section 83 carries out, by switching circuit 6, switching between video and audio bit streams stored in respective code buffers 4, 5 to deliver the bit, stream obtained by switching to header adding circuit 7 to add video packet header or audio packet header thereto to record it into DSM 10 in pack units.

In the case where I picture of any video stream is included in pack which attempt to be recorded into DSM 10, entry packets are multiplexed immediately before that I picture. At this time, control section 83 delivers, to entry packet generating circuit 38, information indicating the relationship between that entry packet and video stream to which the entry packet corresponds to record it into Video stream-No. of entry packet.

The control section 83 determines I-picture length and I-picture END sector-No. relating to respective I pictures similarly to the case of FIG. 7 to allow entry point memory section 39 to store them. After multiplexing operations of all data have been completed, the control section 83 reads out I-picture length and I picture END sector-No. from entry point memory section 39 to deliver them to entry packet generating circuit 38. The entry packet generating circuit 38 generates, on the basis of I-picture length and I-picture END sector-No., I_picture length_−3~I_picture length_+3, I-picture END sector-No._−3~I-picture END sector_No._+3. I-picture length, I-picture END sector-No., I-picture length_−3~I-picture length_+3, I-picture END sector_No._−3~I-picture END sector-No._+3 are delivered to DSM 10 through switching circuit 6, and are respectively written once into corresponding entry packets.

Moreover, in the case where copy; information indicating inhabitation of copy is inputted from input section (not shown), the control section 83 instructs entry packet generating circuit 38 to set value indicating copy inhibit in Copy Management Flag of entry packet to be generated with respect to bit stream for which it is required that copy is inhibited.

Figure 21:
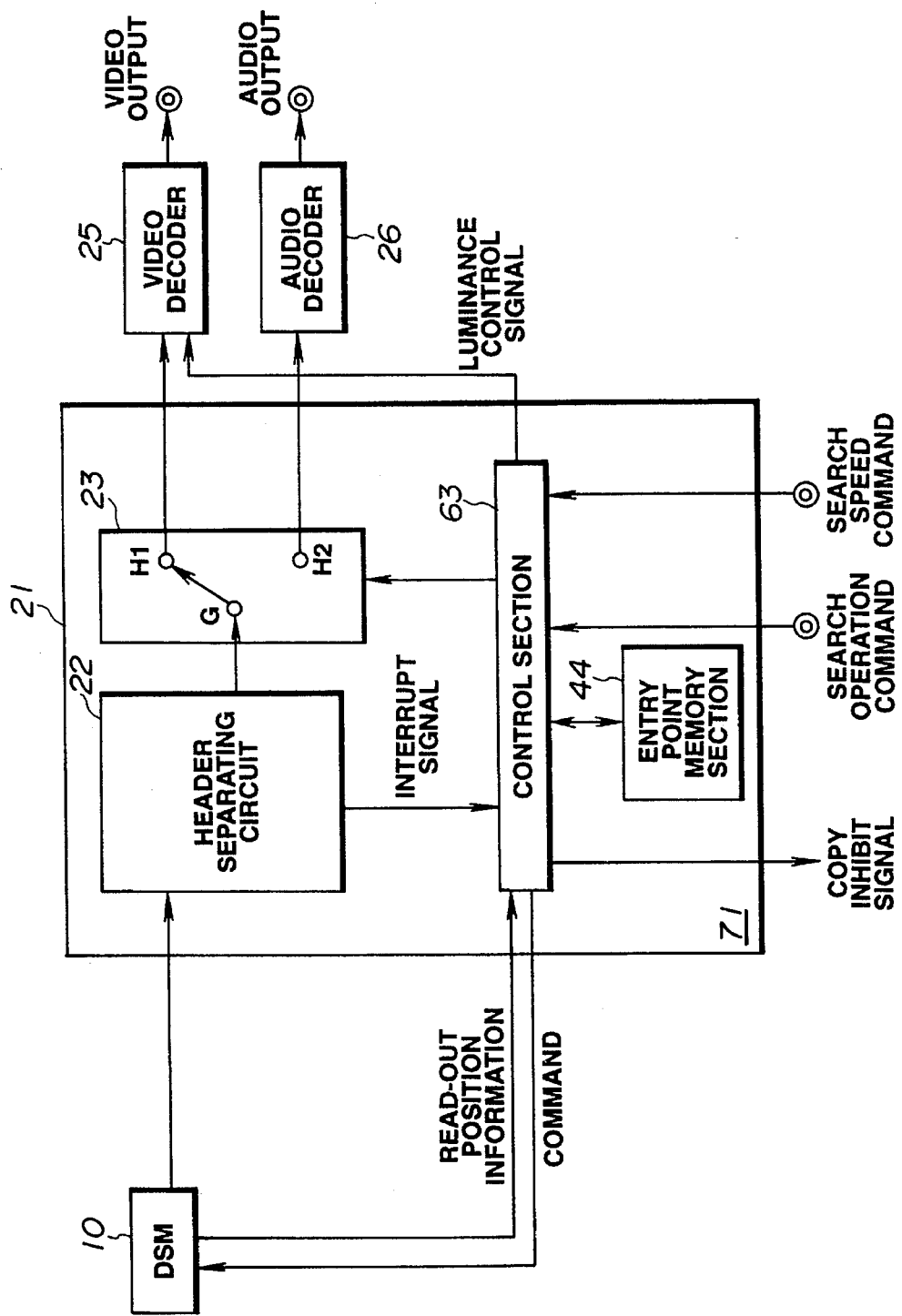
FIG. 21 is a block diagram showing the configuration of a still further embodiment of the data decoding apparatus of this invention.

In the data decoding apparatus shown in FIG. 21, control section 63 is supplied with stream No. (stream-No.) of bit stream to be selected from input section (not shown). In this state, when search command is given to control section 63, the control section 63 reads out Video stream-No. of entry packet delivered from header separating circuit 70 to store, when that value is in correspondence with selected stream-No., entry point information, etc. recorded in that entry packet into entry point memory section 44. Moreover, when that value is not in correspondence with the selected stream-No., the control section cancels that entry point information, etc. Similarly to the operation of the control sections in other embodiments, control section 63 controls DSM 10 on the basis of entry point information stored in entry point memory section 44 to execute search operation. By providing entry packets every video streams to be multiplexed in this way to include identifier indicating correspondence relationship with video stream in the entry packet, it is possible to realize search operations in all multiplexed video streams.

Moreover, in the data decoding apparatus shown in FIG. 21, control section 83 reads thereinto Copy Management Flag of entry packet delivered from header separating circuit 70 to handle, if value indicating copy inhibit is set therein, that video stream as copy inhibit. In the case where video decoder 25 is provided with external output terminal, control section 63 controls video decoder 25 so as not to output bit stream data to the external output terminal with respect to video stream handled as copy inhibit, or sets a value indicating copy inhibit of bit stream sent out in carrying out external output to inform the destination equipment that the bit stream is in copy inhibit state.

In the case of carrying out search operation, the data decoding apparatus continuously displays I pictures by using entry packet information In this case, pictures which are not continuous in point of time would be displayed. There is the possibility that when operator views pictorial images which are not continuous in point of time for a predetermined time of more, eyes might extremely grow weary.

In view of the above, as shown in the data decoding apparatus shown in FIG. 21, control section 63 is caused to be of a structure capable of luminance control signal to video decoder 25 to reduce luminance of display picture during search so that weariness of the eye can be reduced. When operational mode enters search operation in response to command from main control section (not shown), control section 63 sends a control signal to reduce luminance to video decoder 25. When the video decoder 25 receives luminance control signal, it reduces luminance of display picture to allow the display picture to become dark. Moreover, when search operation is completed, control section 63 sends a control signal for allowing luminance to be in normal state for a second time. Thus, video decoder 25 allows luminance of display picture to be in normal state for a second time by that signal. Thus, search operation is carried out, whereby luminance of display picture can be reduced for a time period during which pictures which are discontinuous in point of time are displayed. Thus, weariness of the eyes at the time of search operation can be reduced.

Industrial Applicability

In accordance with the data encoding apparatus to which this invention is applied, since entry packet generated in correspondence with entry point are multiplexed with data of variable rate, it becomes possible to quickly search predetermined data in correspondence with the entry packet. Moreover, when point to be accessed takes place for a time period during which data of variable rate are stored, entry point is generated. When stored data of variable rate reaches a predetermined quantity, presence or absence of entry point for that storage time period is judged. As a result, entry packet is multiplexed with data of variable rate immediately before entry point. Thus, it is possible to securely multiplex entry packets at a predetermined position. Further, since additional information such as enable_flag, entry_point_ position, I-picture length, I-picture END sector-No., Video Stream No., Copy management flag, etc. are inserted into the entry packet, it is possible to set, at the time of encode, necessary information on the decoder side of search speed control or realization of high speed search.

Further, in accordance with the data decoding apparatus of this invention, since data of variable rate and entry packet are separated from data reproduced from recording medium to control access position of the recording medium in correspondence with position information and additional information of entry packets before and after the separated entry packet, it becomes possible to securely quickly search predetermined data. In addition, is possible to control decode operation such as copy inhibit, etc. on the basis of additional information in the entry packet.

What is claimed is:

1. A data transmission method for carrying out transmission of video encoded data suitable for storage in a storage medium, the video encoded data includes intra-coded video data portions, the method comprising the steps of:

detecting a first entry point in the video encoded data which corresponds to a position of a first intra-coded video portion;

generating, on the basis of the detected first entry point, at least one packet that includes position information relating to at least one second entry point and at least one additional information relating to the video encoded data, said second entry point exists in a forward direction or in a backward direction relative to the first entry point and corresponds to a position of at least one second intra-coded video data portion, and multiplexing the packet at a predetermined position of the video encoded data, wherein the multiplexed video encoded data is suitable for selective high speed reproduction of the intra-coded video data portions.

2. A data transmission method as set forth in claim 1, wherein the additional information includes information indicating validity of position information relating to all second entry points included within one packet.

3. A data transmission method as set forth in claim 1, wherein one packet includes position information relating to the plural second entry points, and the additional information respectively includes information independently indicating validity of respective position information.

4. A data transmission method as set forth in claim 1, wherein position information relating to the second entry point is position information relating to entry points existing forward or backward by an arbitrary number of points relative to the first entry point.

5. A data transmission method as set forth in claim 4, wherein position information relating to the second entry point includes position information relating to entry points existing at the positions immediately before and immediately after relative to at least the first entry point.

6. A data transmission method as set forth in claim 4, wherein the additional information includes information indicating interval between the first entry point and the second entry point.

7. A data transmission method as set forth in claim 1, wherein the additional information includes at least one of length information of access unit corresponding to the first entry point and position information of the access unit corresponding to the first entry point.

8. A data transmission method as set forth in claim 1, wherein the additional information includes at least one of length information of access unit corresponding to the second entry point and position information of termination of the access unit corresponding to the second entry point.

9. A data transmission method as set forth in claim 1, wherein the video encoded data is comprised of plural types of data, and the additional information includes discrimination information for discriminating the relationship between respective entry packets and the type of encoded data to which they relate.

10. A data transmission method as set forth in claim 1, wherein the additional information includes information relating to whether copy is permitted or inhibited.

11. A data transmission apparatus adapted for carrying out transmission of video encoded data suitable for storage in a storage medium, the video encoded data includes intra-coded video data portions, the apparatus comprising:

detecting means for detecting a first entry point in the video encoded data which corresponds to a position of a first intra-coded video data portion;

packet generating means for generating, on the basis of the detected first entry point, at least one packet that includes position information relating to at least one second entry point and at least one additional information relating to the video encoded data, said second entry point exists in a forward direction or in a backward direction relative to the first entry point and corresponds to a position of at least one second intra-coded video data portion; and multiplexing means for multiplexing the packet at a predetermined position of the video encoded data, wherein the multiplexed video encoded data is suitable for selective high speed reproduction of the intra-coded video data portions.

12. A data transmission apparatus as set forth in claim 11, wherein the additional information includes information indicating validity of position information relating to all second entry points within one-packet.

13. A data transmission apparatus as set forth in claim 11, wherein one packet includes position information relating to the plural second entry points, and the additional information respectively includes information independently indicating validity of respective position information.

14. A data transmission apparatus as set forth in claim 11, wherein position information relating to the second entry point is position information relating to entry points existing forward or backward by an arbitrary number of points relative to the first entry point.

15. A data transmission apparatus as set forth in claim 14, wherein position information relating to the second entry point includes position information relating to entry points existing at the positions immediately before and immediately after relative to at least the first entry point.

16. A data transmission apparatus as set forth in claim 14, wherein the additional information includes information indicating interval between the first entry point and the second entry point.

17. A data transmission apparatus as set forth in claim 11, wherein the additional information includes at least one of length information of access unit corresponding to the first entry point and position information of termination of the access unit corresponding to the first entry point.

18. A data transmission apparatus as set forth in claim 11, wherein the additional information includes at least one of length information of access unit corresponding to the second entry point and position information of termination of the access unit corresponding to the second entry point.

19. A data transmission apparatus as set forth in claim 11, wherein the video encoded data is comprised of plural types of data, and the additional information includes discrimination information for discriminating the relationship between respective entry packets and the type of encoded data to which they relate.

20. A data transmission apparatus as set forth in claim 11, wherein the additional information includes information relating to whether copy is permitted or inhibited.

21. A data decoding apparatus adapted decoding encoded video reproduction data which has been read out from a recording medium, the reproduction data including intra-coded video data portions, the apparatus comprising:

separating means for separating, from the reproduction data, a first intra-coded video data portion corresponding to a first entry point and a packet including position information relating to at least one second entry point and at least one additional information relating to the reproduction data, said second entry portion exists in a forward direction or in a backward direction relative to the first entry point and corresponds to a position of a second intra-coded video data portion;

decoding means for decoding the encoded reproduction data separated by the separating means; and control means for controlling a read-out position of the recording medium on the basis of the position information and the additional information at a time of a special high speed reproduction of the intra-coded video data portions.

22. A data decoding apparatus as set forth in claim 21, wherein the additional information includes information indicating validity of position information relating to all second entry points included within one packet.

23. A data decoding apparatus as set forth in claim 21, wherein one packet includes position information relating to the plural second entry points, and the additional information respectively includes information independently indicating validity of respective position information.

24. A data decoding apparatus as set forth in claim 21, wherein position information relating to the second entry point is position information relating to entry points existing forward or backward by an arbitrary number of points relative to the first entry point.

25. A data decoding apparatus as set forth in claim 24, wherein position information relating to the second entry point includes position information relating to entry points existing at the positions immediately before and immediately after relative to at least the first entry point.

26. A data decoding apparatus as set forth in claim 24, wherein the additional information includes information indicating interval between the first entry point and the second entry point.

27. A data decoding apparatus as set forth in claim 21, wherein the additional information includes at least one of length information of access unit corresponding to the first entry point and position information of termination of the access unit corresponding to the first entry point.

28. A data decoding apparatus as set forth in claim 21, wherein the additional information includes at least one of length information of access unit corresponding to the second entry point and position information of termination of the access unit corresponding to the second entry point.

29. A data decoding apparatus as set forth in claim 21, wherein the encoded reproduction data is comprised of plural types of data, and the additional information includes discrimination information for discriminating the relationship between respective entry packets and encoded data type to which they relate.

30. A data decoding apparatus as set forth in claim 21, wherein the additional information includes information relating to whether copy is permitted or inhibited, whereby in the case where the information indicates that copy is inhibited, the control means inhibits external output of the encode data.

31. A data decoding apparatus as set forth in claim 21, which includes:

means for generating a control signal for controlling bright of reproduction data decoded by the decoding means at the time of the special high speed reproduction of the intra-coded video data portions.

32. A data recording medium on which video encoded data are recorded, the video encoded data includes intra-coded video data portions, the data recording medium being formed by the steps of:

detecting a first entry point in the video encoded data which corresponds to a position or a first intra-coded video data portion;

generating on the basis of the detected first entry point, at least one packet that includes position information relating to at least one second entry point and at least one additional information relating to the video encoded data, said second entry point exists in a forward direction or in a backward direction relative to the first entry point and corresponds to a position of at least one second intra-coded video data portion;

multiplexing the packet at a predetermined position of the video encoded data; and recording the multiplexed data onto the recording medium, wherein the multiplexed video data is suitable for selective high speed reproduction of the intra-coded video data portions.

* * * * *

UNITED STATES PATENT AND TRADEMARK OFFICE
CERTIFICATE OF CORRECTION

PATENT NO.: 5,621,840
DATED: April 15, 1997
INVENTOR(S): MAKOTO KAWAMURA ET AL.

It is certified that error appears in the above-identified patent and that said Letters Patent is hereby corrected as shown below:

in column 22, line 42, please change "bright" to --brightness--.

Signed and Sealed this

Fifth Day of August, 1997

Attest:

BRUCE LEHMAN

*Attesting Officer*    *Commissioner of Patents and Trademarks*